United States Patent [19]
Rajagopalan

[11] Patent Number: 6,001,930
[45] Date of Patent: *Dec. 14, 1999

[54] GOLF BALL FORMING COMPOSITIONS COMPRISING POLYAMIDE BLENDED WITH SULFONATED OR PHOSPHONATED POLYMERS

[75] Inventor: Murali Rajagopalan, South Dartmouth, Mass.

[73] Assignee: Acushnet Company, Fairhaven, Mass.

[*] Notice: This patent is subject to a terminal disclaimer.

[21] Appl. No.: 08/996,403

[22] Filed: Dec. 22, 1997

Related U.S. Application Data

[63] Continuation-in-part of application No. 08/815,659, Mar. 13, 1997, and a continuation-in-part of application No. 08/862,831, May 23, 1997.

[51] Int. Cl.$^6$ .......................... A63B 37/12; C08L 77/00; C08G 69/42
[52] U.S. Cl. ........................ 525/92 B; 525/178; 525/179; 525/183; 525/184; 525/424; 525/425; 525/432; 525/433; 525/420; 528/321; 473/354; 473/365; 473/374; 473/377; 473/378; 473/385
[58] Field of Search ..................................... 473/354, 365, 473/374, 377, 378, 385; 528/321; 525/92 B, 178, 179, 183, 184, 424, 425, 432, 433, 420

[56] References Cited

U.S. PATENT DOCUMENTS

| | | |
|---|---|---|
| 3,097,194 | 7/1963 | Leonard et al. . |
| 3,397,219 | 8/1968 | Ford et al. . |
| 3,642,728 | 2/1972 | Canter . |
| 3,846,507 | 11/1974 | Thomm . |
| 4,102,876 | 7/1978 | Brenner et al. . |
| 4,220,739 | 9/1980 | Walles . |
| 4,234,184 | 11/1980 | Deleens et al. . |
| 4,255,540 | 3/1981 | Weiss . |
| 4,331,786 | 5/1982 | Foy et al. . |
| 4,387,174 | 6/1983 | Lundberg et al. . |
| 4,615,914 | 10/1986 | Walles . |
| 4,679,795 | 7/1987 | Melvin et al. . |
| 4,858,924 | 8/1989 | Saito et al. . |
| 4,915,912 | 4/1990 | Walles et al. . |
| 4,986,545 | 1/1991 | Sullivan . |
| 5,098,105 | 3/1992 | Sullivan . |
| 5,155,157 | 10/1992 | Statz et al. . |
| 5,239,010 | 8/1993 | Balas et al. . |
| 5,253,871 | 10/1993 | Viollaz . |
| 5,321,089 | 6/1994 | Cadorniga et al. . |
| 5,334,673 | 8/1994 | Wu . |
| 5,359,000 | 10/1994 | Hamada et al. . |
| 5,422,398 | 6/1995 | Weiss . |
| 5,484,870 | 1/1996 | Wu . |
| 5,556,098 | 9/1996 | Higuchi et al. . |
| 5,679,745 | 10/1997 | Hamada . |
| 5,691,066 | 11/1997 | Rajagopalan . |

FOREIGN PATENT DOCUMENTS

| | | |
|---|---|---|
| 60631/96 | 1/1997 | Australia . |
| 6-192512 | 7/1994 | Japan . |
| 849058 | 9/1960 | United Kingdom . |
| 907765 | 10/1962 | United Kingdom . |
| 2278609 | 12/1994 | United Kingdom . |

OTHER PUBLICATIONS

R.A. Weiss et al., "Properties of Polyethylene Modified with Phosphonate Side Groups. I. Thermal and Mechanical Properties", J. Polymer Science: Polymer Physics Ed., vol. 15, 1409–1425 (1977).

R.A. Weiss et al., "Phase Behaviour of Blends of Nylon 6 and Lightly Sulfonated Polystyrene Ionomers", Polymer, vol. 35, No. 9, 1963–1969 (1994).

P. Rajagopalan et al., "Molecular Interpretation of Miscibility in Polyamide–6 Blends with Alkali Ionomers or Sulfonated Polystyrene", J. Polymer Science Part B: Polymer Physics, vol. 33, 495–503 (1995).

R.A. Weiss et. al., "Morphology Control in Polyamide/Ionomer Blends", ANTEC'97, 2653–2657 (1997).

*Primary Examiner*—David Buttner
*Attorney, Agent, or Firm*—Pennie & Edmonds LLP

[57] ABSTRACT

The present invention relates to a golf ball, comprising a cover, a core and optional intermediate layers, wherein the various ball components are formed from compositions comprising a polyamide, in the form of a homopolymer, a copolymer or mixtures thereof. The compositions include a blend of about 1 wt. % to about 99 wt. % of at least one sulfonated and/or phosphonated polymer and about 99 wt. % to about 1 wt. % of at least one polyamide polymer. The polyamides of the present invention comprise polyamides and polyamide copolymers, such as polyamide block copolymers. The sulfonated and/or phosphonated polymer preferably comprises sulfonated thermoplastic elastomers, sulfonated thermoplastic polymers, and mixtures thereof. The present invention is further directed to a method of making a golf ball core, an intermediate layer or a cover composition, comprising blending one or more sulfonated and/or phosphonated polymers and one or more polyamides or polyamide copolymers such that there is mixing of the different polymeric components to give a blend suitable for forming into the above golf ball components.

38 Claims, No Drawings

GOLF BALL FORMING COMPOSITIONS COMPRISING POLYAMIDE BLENDED WITH SULFONATED OR PHOSPHONATED POLYMERS

This is a continuation-in-part of application Ser. No. 08/815,659 filed Mar. 13, 1997 pending and a continuation-in-part of application Ser. No. 08/862,831 filed May 23, 1997 pending.

TECHNICAL FIELD

The present invention is directed to compositions and methods for forming golf ball covers, cores and intermediate layers and a golf ball formed of said compositions having improved properties. The compositions of the invention comprise at least one polyamide, in the form of a homopolymer, a copolymer or mixtures thereof, and at least one sulfonated and/or phosphonated polymer.

BACKGROUND OF THE INVENTION

Three-piece, wound balls with balata (trans-polyisoprene) covers are typically preferred by professional and low handicap amateur golfers. These balls provide a combination of distance, high spin rate, and control that is not available with an ionomer cover or in one-piece and two-piece balls. However, balata cuts easily, and lacks the durability required by the average golfer.

Two-piece golf balls, which are typically used by the average amateur golfer, provide a combination of durability and maximum distance that is not available with balata covered balls. These balls comprise a core, formed of a solid sphere which typically comprises a polybutadiene based compound, encased in an ionomer cover formed of, e.g., SURLYN®. These ionomers are ionic copolymers of an olefin and an unsaturated carboxylic acid in which at least a portion of the carboxylic acid groups have been neutralized with a metal ion. These balls are extremely durable, have good shear resistance and are almost impossible to cut. However, the durability results from the hardness of the ionomer, which gives such balls a very hard "feel" when struck with a golf club that many golfers find unacceptable.

Golf ball manufacturers have attempted to produce golf ball covers that provide the spin rate of balata with the cut resistance of an ionomer by forming blends of high hardness and low hardness ionomers, e.g., U.S. Pat. Nos. 4,884,814, 5,120,791, 5,324,783, 5,415,937 and 5,492,972. However, none of the disclosed ionomer blends have resulted in the ideal balance of carrying distance, coefficient of restitution, spin rate and initial velocity that would approach the highly-desirable playability of a balata covered golf ball.

Adding polar functionality to a nonpolar polymer and forming a blend from the nonpolar polymer and an ionomer is another approach which has been used to provide golf ball covers, with improved properties, from a blend containing an ionomer. For example, U.S. Pat. Nos. 4,986,545, 5,098,105 and 5,359,000 all disclose compatible or miscible blends of an ionomer and another polymer. Compatibility is accomplished by imparting polar functionality to the non-ionomer through a reaction with maleic anhydride. None of these patents, however, discloses blends of a sulfonated and/or phosphonated polymer with a polyamide.

Because of the difficulties encountered when attempting to blend ionomers with other polymers, manufacturers have used compatibilizers to provide or enhance the compatible nature of such blends; see, for example, U.S. Pat. No. 5,321,089. The compatibilizer material is often a block copolymer where each block has an affinity for only one of the blend components to be compatibilized. The compatibilizer is thought to associate across the boundaries between phase-separated regions in the polymer blend. It is used to bind the regions together and to enhance the structural integrity and mechanical properties of the resulting compatibilized material.

U.S. Pat. No. 5,155,157 to Statz et al. describes thermoplastic elastomer (hereafter "TPE") compositions that are blends of a copoly(ether-amide) or copoly(ether-ester) with an acid-containing ethylene copolymer ionomer and an epoxy containing compound, for use in one-piece golf balls and as cores for two-piece and three-piece golf balls. Japanese patent application 6192512 A (1994) discloses compositions which are blends of a thermoplastic polyamide elastomer, an ethylene copolymer ionomer and an epoxy-containing compound for use in two-piece and three-piece golf ball covers and cores. In each of these disclosures, a costly custom-synthesized compatibilizer component is required to compatibilize a blend of one or more ionomers with a polymer that is immiscible with the ionomer. None of the above publications teaches a blend of a sulfonated and/or phosphonated polymer with a polyamide, either with or without a compatibilizer.

Compatibilizers have also been used to provide or enhance the compatible nature of blends of two non-ionomer polymers which are normally incompatible. For example, U.S. Pat. No. 5,422,398 to Weiss describes the use of polystyrene sulfonated to a level of up to 15 mol % as a compatibilizer, which allows the formation of miscible blends from two heteroatom polymers, i.e., polymers comprising amide, ester, ether, sulfone or amine groups. However, this reference does not disclose blends of a phosphonated polymer and a polyamide or blends consisting essentially of a sulfonated polymer and a polyamide. Moreover, the three component blends of this reference are not disclosed to be useful in golf balls.

Two-piece golf balls having covers containing block polyamide copolymers are disclosed in the prior art. For example, U.S. Pat. No. 4,234,184 to Deleens et al. discloses the use of a thermoplastic block copoly(ether-amide) as a cover material for a golf ball having a core and a cover. Deleens et al. also disclose blends of this block copolymer with minor proportions of compatible polymer(s) which are further required to have a melting point between 80° and 150° C. and a Shore D hardness from 35 to 70. Blends of this block copolymer with polyamide are not disclosed.

Several patents disclose blends of polyamide elastomers and ionomers. For example, U.S. Pat. No. 4,858,924 to Saito discloses the use of a thermoplastic resin with a flexural modulus of 1,500 to 5,000 kg/cm$^2$ as the cover of a golf ball. Particularly, polyamide elastomer, urethane elastomer, styrene-butadiene copolymer elastomer and polyester elastomer are said to be preferred when used alone or blended with a matrix resin, that is, another like flexible thermoplastic resin. The polyester elastomers are said to include block copoly(ether-esters), block copoly(lactone-esters) and aliphatic and aromatic dicarboxylic acid copolymerized polyesters. However, this reference does not teach that polyamide can be a matrix resin.

Multilayer golf balls containing block polyamide copolymers are disclosed in the prior art. For example, pertaining to covers, UK Patent Application GB 2,278,609 A discloses a three-piece golf ball with an outer or cover layer formed from a relatively soft, low modulus (1 to 10 kpsi) nonionomer TPE, such as a polyetheramide (PEBAX® from Elf Atochem S.A. is taught). Blends of these materials with sulfonated and/or phosphonated polymers are not disclosed.

Intermediate layers containing block copolymers are disclosed for multilayer golf balls. For example, U.S. Pat. No. 5,556,098 to Higuchi et al. discloses the use of a three-layer golf ball with a soft middle layer composed of a blend of a polyamide elastomer and an ionomer, such that the JIS C hardness of the blend is less than 80. The exact chemical composition or structure of the polyamide elastomer is not disclosed other than that it is said to be a thermoplastic elastomer. However, Higuchi does not disclose blends of these elastomers with sulfonated and/or phosphonated polymers.

U.S. Pat. No. 5,253,871 to Viollaz discloses the use of at least 10% of a block copoly(amide-ether) elastomer, optionally blended with an ionomer, for use as the middle layer of a three-layer golf ball. The hardness of the block copolymer is said to be within the range of 30–40 Shore D hardness while the corresponding hardness of the ionomer component is said to be between 55–65 Shore D. The overall hardness of the middle layer is said to range from 20–50 Shore D. The cover may also be a block copoly(amide-ether) and ionomer blend but its overall hardness must be greater than that of the adjacent middle layer. However, Viollaz is silent on the flexural modulus characteristics of the blends or their components. Furthermore, Viollaz does not disclose blends of these block copolymers with sulfonated and/or phosphonated polymers.

Several references disclose blends of a polyamide and sulfonated polystyrene ionomers. For example, P. Rajagopalan et al. (J. Polym. Sci. Pt. B, Polym. Physics, 33:495–503 (1995)) disclose that blends of polyamide-6 and the lithium ionomer of 9.8 mol. % and 5.4 mol. % sulfonated polystyrene are miscible over a wide composition range. R. A. Weiss and X. Lu disclose that, in compatible polyamide/sulfonated ionomer blends, a complex forms between the metal sulfonate of a sulfonated polystyrene ionomer and the amide group of polyamide-6; see Polymer, 35:1963–1969 (1994). Similar complexes are also thought to form between the lithium sulfonate of a sulfonated polystyrene ionomer and the amide group of poly(N,N'-dimethylethylene sebacamide) (a methylated polyamide); see R. A. Weiss et al., ANTEC '97, 2653–2657 (1997). None of these references, however, disclose the use of such blends in golf balls. Moreover, none of these references disclose blends of a phosphonated polymer or a non-ionomer sulfonated polymer with a polyamide.

Australian patent publication No. AU-A-60631/96 discloses the use of a polyamide polymer in golf balls, but only in a three-piece golf ball. The teachings of this reference are further limited in many respects. For example, the polyamide must be present only in the intermediate layer of the three-piece golf ball and then present only in the form of a blend comprising only 50% to 95% polyamide by weight. Moreover, the reference teaches that the blend comprises only certain thermoplastic elastomers. Styrene-butadiene-styrene block copolymer, maleic anhydride-modified styrene-butadiene-styrene block copolymer, ethylene-ethyl acrylate copolymer, and maleic anhydride-modified ethylene-ethyl acrylate copolymer are the only thermoplastic elastomers disclosed for blending with the polyamide, not sulfonated and/or phosphonated materials.

U.S. Pat. No. 4,679,795 to Melvin et al. discloses blends of optical brighteners with the following golf ball cover materials: polyolefins and their copolymers; polyurethanes; polyamides; polyamide blends with SURLYN®, polyethylene, ethylene copolymers and EPDM; acrylic resins; thermoplastic rubbers such as urethanes, styrene block copolymers, copoly(ether-amides) and olefinic thermoplastic rubbers; thermoplastic polyesters and polyester TPEs; and blends of thermoplastic rubbers with nylon. The reference contains no teaching or suggestion, however, to form a polyamide-sulfonated and/or phosphonated polymer blend.

None of the blended compositions described above offers the combination of durability and distance provided by two-piece golf balls with ionomer covers and the high spin rate and control that is available with three-piece, wound golf balls having balata covers. Therefore, there remains a need for golf ball cores, intermediate layers and covers that comprise a polyamide blended with a sulfonated and/or phosphonated polymer, to provide one-piece, two-piece, three-piece wound golf balls (with solid or liquid centers) and/or multilayer golf balls with the durability and distance of a SURLYN® covered two-piece ball and the feel, click, and control of a balata covered three-piece ball.

SUMMARY OF THE INVENTION

One embodiment of the present invention relates to a golf ball comprising a cover and a core, wherein the cover is formed of a composition which comprises a blend of from about 1 wt. % to about 99 wt. % of at least one polyamide polymer and from about 99 wt. % to about 1 wt. % of at least one sulfonated and/or phosphonated polymer. The sulfonated and/or phosphonated polymer may be a sulfonated polymer, a phosphonated polymer, sulfonated and phosphonated polymer or mixtures thereof.

Preferably, the polyamide polymer has a flexural modulus of from about 30,000 psi to about 500,000 psi and is a polyamide homopolymer, a polyamide copolymer or mixtures thereof. The polyamide homopolymer may be polyamide 6, polyamide 11, polyamide 12, polyamide 4,6, polyamide 6,6, polyamide 6,9, polyamide 6,10, polyamide 6,12 or mixtures thereof. The polyamide copolymer may be polyamide 6/6,6, polyamide 6,6/6,10, polyamide 6/6,T, polyamide 6/6,6/6,10 or mixtures thereof.

Preferably, the sulfonated and/or phosphonated polymer is a sulfonated polymer which contains from about 0.1 mol % to about 30 mol % sulfonate groups wherein the sulfonate groups are present in the form of a sulfonic acid, a sulfonamide, or mixtures thereof. The sulfonated polymer may be at least one sulfonated thermoplastic elastomer, at least one sulfonated thermoplastic polymer, or mixtures thereof.

Preferably, the sulfonated thermoplastic elastomer has a flexural modulus of from about 1,000 psi to about 150,000 psi and comprises a block copoly(ester-ester), a block copoly(ester-ether), a block copoly(amide-ester), a block copoly(amide-ether), a block copoly(urethane-ester), a block copoly(urethane-ether), a block polystyrene thermoplastic elastomer comprising an unsaturated rubber, a block polystyrene thermoplastic elastomer comprising a functionalized substantially saturated rubber, an unvulcanized thermoplastic and elastomer blend comprising polypropylene and ethylene-propylene-diene monomer terpolymer or ethylene-propylene copolymer rubber, a thermoplastic and elastomer blend comprising polypropylene and ethylene-propylene-diene monomer terpolymer or ethylene-propylene copolymer rubber wherein the rubber is dynamically vulcanized, a melt-bondable thermoplastic and elastomer blend wherein the rubber is dynamically vulcanized, or mixtures thereof.

Preferably, the sulfonated thermoplastic polymer has a flexural modulus of from about 30,000 psi to about 500,000 psi and comprises a polyolefin, a polyester, a polyamide, a polycarbonate, a polyphenylene oxide, a polyether ketone, a polysulfone, a poly(phenylene sulfide), a poly(ether imide), a reinforced engineering plastic, a polymer comprising styrene, or mixtures thereof.

If desired, the composition of the invention may be substantially optical brightener-free. The composition may further comprise from about 90% to about 1% by weight of at least one co-component polymer and from about 10% to about 99% by weight of the polyamide-sulfonated and/or phosphonated polymer blend. Preferably the co-component polymer has a flexural modulus of from about 1,000 psi to about 500,000 psi and is a thermoplastic elastomer, a thermoplastic polymer or mixtures thereof.

The co-component thermoplastic elastomer may be a block copoly(ester-ester), a block copoly(ester-ether), a block copoly(amide-ester), a block copoly(amide-ether), a block copoly(urethane-ester), a block copoly(urethane-ether), a block polystyrene thermoplastic elastomer comprising an unsaturated rubber, a block polystyrene thermoplastic elastomer comprising a functionalized substantially saturated rubber, an unvulcanized thermoplastic and elastomer blend comprising polypropylene and ethylene-propylene-diene monomer terpolymer or ethylene-propylene copolymer rubber, a thermoplastic and elastomer blend comprising polypropylene and ethylene-propylene-diene monomer terpolymer or ethylene-propylene copolymer rubber wherein the rubber is dynamically vulcanized, a melt-bondable thermoplastic and elastomer blend wherein the rubber is dynamically vulcanized, or mixtures thereof.

The co-component thermoplastic polymer may be an olefinic polymer; poly(amide); poly(ethylene terephthalate); poly(butylene terephthalate); poly(trimethylene terephthalate); poly(vinyl alcohol); poly(vinyl acetate); poly(silane); poly(vinylidene fluoride); acrylonitrile-butadiene-styrene copolymer; their copolymers, including those comprising a functional comonomer; or mixtures thereof.

In another embodiment, the invention relates to a golf ball comprising a cover layer, a core layer and at least one intermediate layer interposed between the cover layer and the core layer, where at least one of the layers comprises a composition which comprises a blend of from about 1 wt. % to about 99 wt. % of at least one sulfonated and/or phosphonated polymer and from about 99 wt. % to about 1 wt. % of at least one polyamide polymer. When the intermediate layer comprises this composition, at least one intermediate layer of the golf ball of this embodiment may be a wound layer. Alternatively, the core layer may be a liquid or solid center wrapped in elastomeric windings. When the intermediate layer comprises this composition, the cover layer may comprise nonionic olefinic polymer; polyolefin ionomer; styrene-butadiene-styrene ionomer; styrene-(hydrogenated butadiene)-styrene ionomer; poly(isoprene) which is at least partially crosslinked; poly(butadiene) which is at least partially crosslinked; a thermoset poly(urethane); a thermoset poly(urea); or mixtures thereof.

An additional embodiment of the present invention is a golf ball comprising a cover layer, a core layer and at least one intermediate layer interposed between the cover layer and the core layer, where at least one of the layers comprises a polyamide which may be at least one sulfonated polyamide, phosphonated polyamide, sulfonated and phosphonated polyamide or mixture thereof. At least one intermediate layer of the golf ball of this embodiment may be a wound layer. Alternatively, the core layer may be a liquid or solid center wrapped in elastomeric windings. Preferably, the polyamide is at least one sulfonated polyamide with a flexural modulus of from about 30,000 psi to about 500,000 psi.

The polyamide may comprise an aromatic group, preferably present in the form of m-phenylenediamine, p-phenylenediamine, m-xylylenediamine, isophthalic acid, terephthalic acid, 2,6-naphthalenedicarboxylic acid or mixtures thereof. The polyamide comprising an aromatic group may be PA-6,T/6,6; PA-6,T/6,I/6,6; PA-6,T/6; PA-6,T/6,I; PA-6,T/6,6 or mixtures thereof.

The invention also relates to a method of making a golf ball, which comprises forming a core layer, forming at least one intermediate layer about the core layer, and forming a cover layer over the at least one intermediate layer, where at least one of the layers is formed of a composition comprising a blend of from about 1 wt. % to about 99 wt. % of at least one polyamide polymer and from about 99 wt. % to about 1 wt. % of at least one sulfonated and/or phosphonated polymer.

The invention additionally relates to a method of making a golf ball, which comprises forming a core layer, forming at least one intermediate layer about the core layer, and forming a cover layer over the at least one intermediate layer, where at least one of the layers is formed of a polyamide. The polyamide is selected from the group consisting of a sulfonated polyamide, a phosphonated polyamide, a sulfonated and phosphonated polyamide and mixtures thereof.

DETAILED DESCRIPTION OF THE INVENTION

The present invention relates to golf ball forming compositions having unexpectedly improved durability, initial velocity and shear resistance. The compositions of the invention comprise at least one polyamide, in the form of a homopolymer, a copolymer or mixtures thereof. The polyamide is present in the form of a blend with at least one sulfonated and/or phosphonated polymer or resin, which is present in the form of a sulfonated and/or phosphonated thermoplastic polymer, a sulfonated and/or phosphonated thermoplastic elastomer, a sulfonated and/or phosphonated thermoset polymer or mixtures thereof. The invention provides great flexibility for selecting the modulus and hardness of each of the blend components over a wider range than is possible with blends composed solely of ionomer components or without at least one sulfonated and/or phosphonated component.

The present invention is directed to methods and compositions for use in the manufacture of golf balls, particularly, golf ball cores, covers and intermediate layers. As used herein, an "intermediate layer" is an independent layer between a cover and a core. Such an intermediate layer may be distinguished from a cover or a core by some difference in the materials comprising the layers. An intermediate layer may, for example, have a distinct composition, a different proportion of components, a different molecular weight of a component, a different molecular weight distribution of a component, or a different degree of curing or crosslinking when compared to the corresponding attribute of the component comprising the adjacent cover or core layer. Optionally, an intermediate layer may be a wound layer, i.e., comprise the windings of a wound golf ball such as a liquid or solid center wrapped in elastomeric windings, as known to those skilled in the golf ball art. Moreover, a "cover" or a "core" as these terms are used herein may comprise a single layer or a plurality of layers. An intermediate layer may be used, if desired, with a dual or a multilayer cover or a dual or a multilayer core, or with both a multilayer cover and a multilayer core. Therefore, an intermediate layer is also sometimes referred to in the art as an inner cover layer, as an outer core layer or as a mantle layer.

The compositions of the present invention comprise a polyamide and/or polyamide copolymer, such as nylon and nylon copolymer, blended with a sulfonated and/or phosphonated polymer. As used herein, a "copolymer" is defined as a polymer comprising at least two different monomeric units. Thus, a polymeric chain made up of three different monomers (also known as a terpolymer) is included within the term "copolymer," as are polymer chains containing more than three different monomeric units. Copolymers may be formed in many ways known to those of ordinary skill in the art, for example, by polymerizing two different monomers, by graft copolymerization or block copolymerization, wherein an existing polymer chain is further reacted with a different monomer, and by a post-polymerization reaction, e.g., partial hydrolysis of the ester side-groups of a polymer.

As used herein, "sulfonated and/or phosphonated polymers" are defined as polymers and copolymers comprising sulfonate moieties or derivatives thereof, polymers and copolymers comprising phosphonate moieties or derivatives thereof, polymers and copolymers comprising sulfonate and phosphonate moieties or derivatives thereof, and mixtures of these polymers and copolymers, with the proviso that the sulfonated and/or phosphonated polymer is not an ionomer, i.e., the sulfonate and/or phosphonate moieties are not present in ionomeric form, such as a sulfonic acid side-group neutralized by a metal cation. Sulfonated and/or phosphonated polymers include sulfonated and/or phosphonated thermoplastic polymers, sulfonated and/or phosphonated thermoplastic copolymers, sulfonated and/or phosphonated TPEs, sulfonated and/or phosphonated thermoset polymers, sulfonated and/or phosphonated thermoset copolymers and mixtures of these materials.

When the compositions of the invention have no added compatibilizing component, this condition is defined and referred to herein as being "substantially compatibilizer-free." Moreover, when the compositions of the invention have no added optical brightener component, this condition is defined and referred to herein as being "substantially optical brightener-free."

The compositions of the invention can be used in the formation of golf ball covers and as intermediate layers for multi-layer golf balls. Such intermediate layers, of course, may be wound layers as is well known to those skilled in the art. Further, the compositions of this invention can be used to form covers for two-piece golf balls. They can also be used to form unitary or one-piece golf balls. Additionally, they can be used to form golf ball cores for two piece or multi-layer balls.

The present invention is further directed to a method of making a golf ball core, an intermediate layer and/or a cover, comprising blending one or more polyamides or one or more polyamide copolymers with one or more sulfonated and/or phosphonated polymers such that there is mixing of the different polymeric components to give a blend suitable for forming into the above golf ball components.

In the case of blends, as described above, such blends may comprise from about 1% to about 99% by weight of polyamide and from about 99% to about 1% by weight of sulfonated and/or phosphonated polymer. Preferably, the blend comprises from about 5% to about 95% by weight of polyamide and from about 95% to about 5% by weight of sulfonated and/or phosphonated polymer. More preferably, the blend comprises from about 10% to about 85% by weight of polyamide and from about 90% to about 15% by weight of sulfonated and/or phosphonated polymer. Most preferably, the blend comprises from about 25% to about 85% by weight of polyamide and from about 75% to about 15% by weight of sulfonated and/or phosphonated polymer.

The polymer blends of this invention can be prepared with blend components of varying molecular architecture. Examples of the parameters which may be varied include molecular weight, molecular weight distribution, tacticity, the amount and type of sulfonation, the amount and type of phosphonation, the distribution of sulfonation, the distribution of phosphonation and, optionally, branching, degrees and arrangements of blockiness, block molecular weight and block molecular weight distribution, as is well known to those knowledgeable in the art of blending polymers.

The polyamide component useful in forming the compositions of this invention is a thermoplastic with repeating amide groups. These are commonly known as nylons. This component can be comprised of a homopolymer, a copolymer, including a block copolymer, or a blend of two or more variations of any or all of the above types of polyamides.

Polyamide homopolymers are produced by two common methods. In the first, a compound containing one organic acid-type end-group and one amine end-group is formed into a cyclic monomer. The polyamide is then formed from the monomer by a ring-opening polymerization. These polyamides are commonly designated as polyamide 6, polyamide 11, polyamide 12, etc., where the number indicates the number of carbon atoms making up the ring in the monomer. The second method involves the condensation polymerization of a dibasic acid and a diamine. These polyamides are commonly designated as polyamide 4,6, polyamide 6,6, polyamide 6,9, polyamide 6,10, polyamide 6,12, etc., where the first number indicates the number of carbon atoms connecting the two amine groups in the diamine and the second number indicates the number of carbon atoms connecting the two acid groups in the dibasic acid, including those in the acid groups.

As known to those in the art, the carbon atom groups connecting the acid and/or amine functional groups are not limited to linear aliphatic groups. For example, the diamine may be alicyclic, such as piperazine (hereafter "PIP"), or branched, such as 2-methylpentamethylenediamine (hereafter "MPMD") or a mixture of 2,2,4- and 2,4,4-trimethylhexamethylenediamine (hereafter "TMD").

Preferred polyamide homopolymers include polyamide 4, polyamide 6, polyamide 7, polyamide 11, polyamide 12, polyamide 13, polyamide 4,6, polyamide 6,6, polyamide 6,9, polyamide 6,10, polyamide 6,12, polyamide 12,12, polyamide 13,13 and mixtures thereof. More preferred polyamide homopolymers include polyamide 6, polyamide 11, polyamide 12, polyamide 4,6, polyamide 6,6, polyamide 6,9, polyamide 6,10, polyamide 6,12 and mixtures thereof. The most preferred polyamide homopolymers are polyamide 6, polyamide 11, polyamide 12 and mixtures thereof.

Alternatively, the polyamide may comprise an aromatic group. For example, a polyamide formed by condensation polymerization may be formed from an aliphatic diacid and a diamine comprising an aromatic group, e.g., m-phenylenediamine (hereafter "MPD"), p-phenylenediamine (hereafter "PPD") or m-xylylenediamine (hereafter "MXD"). The polyamide PA-MXD,6 available as RENY® from Mitsubishi Gas Chem. Co., for example, results from the condensation polymerization of MXD and adipic acid.

Another way to form a polyamide comprising an aromatic group is from a condensation polymerization of an aliphatic diamine and a diacid comprising an aromatic group, e.g., isophthalic acid (hereafter "I"), terephthalic acid (hereafter "T") or 2,6-naphthalenedicarboxylic acid (hereafter "N"). The polyamide PA-TMD,T available as TROGAMID® from Hüls A. G., for example, results from the condensation polymerization of TMD and terephthalic acid.

Still another way to form a polyamide comprising an aromatic group is from a condensation polymerization of a diacid comprising an aromatic group and a diamine comprising an aromatic group. For example, the polyamide PA-PPD,T available as KEVLAR® from DuPont, results from the condensation polymerization of PPD and the diacid chloride derivative of terephthalic acid and the polyamide PA-MPD,I available as NOMEX® from DuPont, results from the condensation polymerization of MPD and the diacid chloride derivative of isophthalic acid.

Preferred aromatic polyamides are formed from the monomers m-phenylenediamine, p-phenylenediamine, m-xylylenediamine, isophthalic acid, terephthalic acid, 2,6-naphthalenedicarboxylic acid and mixtures thereof. Preferred aromatic polyamides include but are not limited to PA-6,T/6,6; PA-6,T/6,I/6,6; PA-6,T/6; PA-6,T/6,I; PA-6,T/6,6 and mixtures thereof.

Polyamide copolymers are produced by several common methods. They are produced from ring-opening polymerization by using two or more cyclic monomers with different numbers of carbon atoms making up each monomeric ring. Additionally, polyamide copolymers are produced from condensation polymerization by using a single dibasic acid and two or more different diamines, e.g., each diamine differing by the number of carbon atoms separating the two amine groups or by the structure of the group, for example, aliphatic, branched, alicyclic, aromatic or aralkyl. Alternatively, polyamide copolymers are produced from condensation polymerization by using a single diamine and two or more different dibasic acids, each differing as described above, or by using two or more different diamines and dibasic acids. Further, polyamide copolymers are produced by blending two or more polyamide melts and holding the materials in the molten state for a sufficient time period such that partial or full randomization occurs. Polyamide copolymers are commonly designated by separating the symbols for the homopolymers by the symbol "/". For the purposes of this application, the component named first can be either the major or a minor component of the copolymer.

If desired, at least one of these polyamide copolymer components may comprise an aromatic group, thereby producing a polyamide comprising an aromatic group in the form of a mixed aliphatic-aromatic copolyamide. For example, the polyamides PA-6,T/6,6 and PA-6,T/6,I/6,6, available as SUPER AMODEL® and AMODEL A-1000®, respectively, from Amoco, the polyamide PA-6,T/6, available as ULTRAMID T® from BASF, and the polyamides PA-6,T/6,I and PA-6,T/6,6, available as ARLEN A® and ARLEN C®, respectively, from Mitsui may be used.

Preferred polyamide copolymers include polyamide 6/6,6, polyamide 6,6/6,10, polyamide 6/6,T, polyamide 6/6,6/6,10 and mixtures thereof.

The polyamide component of this invention has a Shore D hardness of at least about 40, as measured by ASTM method D-2240, a flexural modulus, as measured by ASTM method D-790, of at least about 30,000 psi, preferably from about 30,000 psi to about 500,000 psi, more preferably from about 50,000 psi to about 500,000 psi, and a melt index from about 0.5 to about 100 g/10 min, as measured by ASTM method D-1238, condition E using a 2.16 kg weight.

In the present invention, at least one polyamide polymer is combined with at least one sulfonated and/or phosphonated polymer according to methods well known in the art for combining materials for use in golf ball compositions. In particular, the polyamide polymers of the invention may be combined with any other sulfonated and/or phosphonated TPE polymer, sulfonated and/or phosphonated thermoplastic polymer, or sulfonated and/or phosphonated thermoset polymer that is or can be used in golf ball covers.

As used herein, a thermoplastic polymer is exclusive of a thermoplastic elastomer polymer (TPE) in that, as one of ordinary skill in the art would recognize, a TPE exhibits the typical mechanical response, not of a thermoplastic, but of an elastomer. For example, a thermoplastic elastomer polymer should stretch rapidly and considerably under tension, reach high elongations with low damping, i.e., little loss of energy as heat, and should retract rapidly from high elongations, exhibiting the phenomenon of snap or rebound.

As used herein, a thermoset polymer is exclusive of a TPE in that, as one of ordinary skill in the art would recognize, a TPE exhibits the typical ability of a thermoplastic to liquify and flow when subjected to suitably high shear stresses at suitably high temperatures while a thermoset, comprising crosslinks, does not. Moreover, uncrosslinked thermoset polymers include chemical groups capable of forming crosslinks while such groups are not required to be present in TPEs.

The term "sulfonated polymer" when used with reference to the polymer blends of this invention is intended to include both the sulfonated polymers produced by copolymerization with a sulfonated monomer and polymers and copolymers sulfonated by using a sulfonation agent in a post-polymerization reaction. The term "phosphonated polymer" when used with reference to the polymer blends of this invention is intended to include both the phosphonated polymers produced by copolymerization with a phosphonated monomer and polymers and copolymers phosphonated by using a phosphonation agent in a post-polymerization reaction. The term "sulfonated and/or phosphonated polymer" when used with reference to the polymer blends of this invention is intended to include the polymers and copolymers produced by: copolymerization with a sulfonated monomer, copolymerization with a phosphonated monomer, copolymerization with a sulfonated monomer and with a phosphonated monomer, sulfonating using a sulfonation agent in a post-polymerization reaction, phosphonating using a phosphonation agent in a post-polymerization reaction, and sulfonating and phosphonating using a sulfonation agent and a phosphonation agent in at least one post-polymerization reaction.

If desired, the sulfonated and/or phosphonated polymer may be prepared by copolymerizing a sulfonated and/or phosphonated monomer with at least one other comonomer. For example, U.S. Pat. Nos. 4,102,876 and 4,387,174 disclose the formation of sulfonated copolymers, terpolymers and the like by free radical copolymerization of a vinyl monomer comprising a sulfonate substituent with at least one non-sulfonated vinyl comonomer.

When the sulfonated and/or phosphonated monomer further comprises a vinyl group, such as is suitable for copolymerization using polymerization initiators or catalysts, e.g., free radical, redox, Ziegler-Natta, metallocene, anionic and cationic initiators, the monomer is characterized by one of the following formulas:

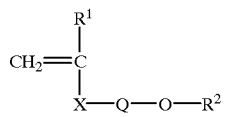
(I)

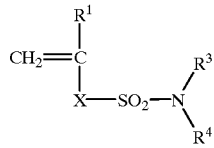
(II)

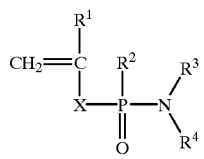
(III)

wherein $R^1$, $R^3$, $R^4$ and $R^5$ are, independently, hydrogen or an alkyl group ranging from methyl to decyl inclusive and may be linear or branched; $R^2$ is hydrogen, —$OR^5$ or —$NR^3R^4$; X is aromatic or $(CH_2)_n$ where n is 0, 1, 2, 3 or 4;

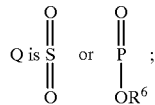

and $R^6$ is $R^5$ or —$NR^3R^4$.

Preferably, when the sulfonated monomer further comprises a vinyl group, it has one of the following structures:

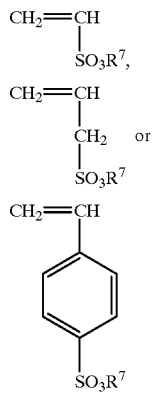

wherein each $R^7$ is, independently, hydrogen or an alkyl group ranging from methyl to decyl inclusive and may be linear or branched. Preferably, each $R^7$ is, independently, an alkyl group ranging from methyl to butyl inclusive and may be linear or branched. More preferably, each $R^7$ is methyl.

Also preferably, when the phosphonated monomer further comprises a vinyl group, the structure is:

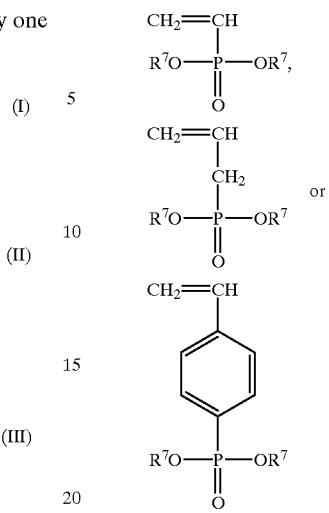

wherein each $R^7$ is, independently, hydrogen or an alkyl group ranging from methyl to decyl inclusive and may be linear or branched. Preferably, each $R^7$ is, independently, an alkyl group ranging from methyl to butyl inclusive and may be linear or branched. More preferably, each $R^7$ is methyl.

A vinyl comonomer, which is not sulfonated and/or phosphonated, is used to form a copolymer with at least one sulfonated and/or phosphonated vinyl monomer. The vinyl comonomer may be any material comprising at least one vinyl group and be able to be polymerized by polymerization initiators or catalysts, e.g., free radical, redox, Ziegler-Natta, metallocene, anionic and cationic initiators, as known to those skilled in the polymer art. Preferably, the vinyl comonomer is an olefin with attached linear or branched alkyl groups having from about 1 to about 18 carbon atoms which includes but is not limited to the following materials: an α-olefin monomer containing from 2 to 10 carbon atoms, e.g., ethylene, propylene, butene, hexene, octene and diene monomers, e.g., butadiene and isoprene; an alkyl acrylate or an alkyl alkylacrylate monomer, wherein each alkyl group ranges, independently, from methyl to decyl inclusive and may be linear or branched; a glycidyl acrylate or a glycidyl alkylacrylate monomer, wherein the alkyl group ranges from methyl to decyl inclusive and may be linear or branched; a vinyloxazoline or 1-alkyl vinyloxazoline monomer, wherein the alkyl group ranges from methyl to decyl inclusive and may be vinyloxazoline or 1-alkyl vinyloxazoline monomer, wherein the alkyl group ranges from methyl to decyl inclusive and may be linear or branched; and maleic anhydride. The vinyl comonomer may also be a material which copolymerizes with a sulfonated vinyl monomer, such as carbon monoxide or sulfur dioxide.

Upon initiation by polymerization initiators and under conditions known to those skilled in the polymerization art, copolymers and the like are formed by polymerizing at least one sulfonated or phosphonated monomer with at least one other comonomer which is non-sulfonated and non-phosphonated.

The sulfonated and/or phosphonated monomers suitable for condensation copolymerization are characterized by one of the following formulas (IV) through (VII):

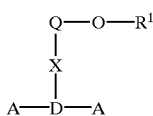
(IV)

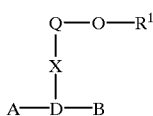
(V)

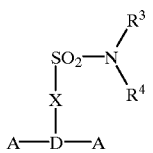
(VI)

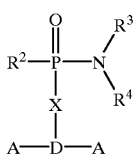
(VII)

wherein $R^1$, $R^2$, $R^3$, $R^4$, $R^5$, $R_6$, X and Q are defined above; A and B comprise functional groups reactive through condensation polymerization; and D comprises a functional group, not reactive through condensation polymerization, to which the reactive functional groups and the sulfonate and/or phosphonate functionality are attached. The types of groups which may comprise A, B and D are well-known in the polymer art. For example, a copolyamide condensation as described above can be modified to yield a partially sulfonated polymer as follows. A sulfonated diamine monomer, obtained from formula (IV) when A is $NH_2$, D is ($CH_2$—$C_4H_7$—$CH_2$), X is $(CH_2)_0$ and Q is $SO_2$, may be copolymerized with 1,6-diaminohexane and adipic acid to yield a partially sulfonated polyamide 6,6 copolymer. Alternatively, a sulfonated amino acid, obtained from formula (V) when A is $NH_2$, B is COOH, D is ($CH_2$—$C_3H_5$—$CH_2$), X is $(CH_2)_0$ and Q is $SO_2$, may be copolymerized with 6-aminohexanoic acid to yield a partially sulfonated polyamide 6 copolymer.

A sulfonated and/or phosphonated monomer suitable for ring-opening copolymerization is characterized by one of the following formulas (VIII) through (X):

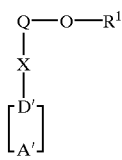
(VIII)

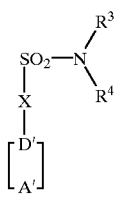
(IX)

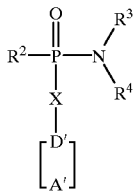
(X)

wherein $R^1$, $R^2$, $R^3$, $R^4$, $R^5$, $R^6$, X and Q are defined above; A' comprises a functional group reactive through ring-opening polymerization; and D' comprises a cyclic functional group not reactive through ring-opening polymerization (the ring further comprising the reactive functional group A') to which the sulfonate and/or phosphonate functionality is attached. The types of groups which may comprise A' and D' are well-known in the polymer art. For example, the ring-opening copolyamide copolymerization as described above can be modified so that it yields a partially sulfonated polyamide copolymer as follows. A sulfonated cyclic monomer, obtained from formula (VIII) when A' is —NH—CO—, D' is —($CH_2$—$C_3H_5$—$CH_2$)—, X is $(CH_2)_0$ and Q is $SO_2$, may be copolymerized with ε-caprolactam to yield a partially sulfonated polyamide 6 copolymer.

As would be readily apparent to those skilled in the art, protecting groups may be required under certain polymerization conditions. For example, if the sulfonated monomer is present in the form of a sulfonic acid and/or the phosphonated monomer is present in the form of a phosphonic acid, then protecting groups may be required to minimize reaction of the acid during copolymerization. Morrison and Boyd discuss the protection of such groups, which may later be removed to reform the acid after condensation copolymerization is complete. (See: R. T. Morrison and R. N. Boyd, "Organic Chemistry", 4th Ed., Allyn and Bacon, Boston, 1983).

The above examples demonstrate the formation of partially sulfonated polyamides by condensation polymerization and by ring-opening polymerization. However, as those skilled in the copolymerization art will recognize, these techniques may be readily adapted to the formation of a variety of copolymers which are partially sulfonated and/or phosphonated. For example, partially sulfonated and/or phosphonated condensation copolymers may be formed; these include, but are not limited to, the following types of copolymers: polyesters, polyanhydrides, polyacetals, polyurethanes, polyureas, cellulosics, phenol-aldehyde copolymers, urea-aldehyde copolymers, polysulfides and polysiloxanes. Also, partially sulfonated and/or phosphonated ring-opening copolymers may be formed; these include, but are not limited to, the following types of copolymers: polycarbonates, polyethers, polyesters, polyanhydrides, poly-N-carboxy-α-amino acid anhydrides, polyacetals, polysiloxanes, polyamines, polysulfides, polyphosphazenes and polysilazanes.

Random, block or alternating partially sulfonated and/or phosphonated copolymers may be formed by methods known in the copolymerization art. Random and block copolymers are preferred.

Alternatively, the sulfonated and/or phosphonated polymer may be prepared by sulfonating and/or phosphonating a substrate comprising a polymer, copolymer, and the like with a sulfonation and/or a phosphonation agent. Typically, a group comprising a sulfate and/or phosphonate or derivative thereof is reacted with the substrate or grafted onto the substrate. Preferably, the substrate has an aromatic group, vinyl unsaturation or both of these characteristics. More preferably, the substrate comprises an aromatic group. The aromatic group can be present in the main polymer chain of a polymeric substrate, in a side-group attached to the main polymer chain of a polymeric substrate, or both.

For example, as shown in Equation (1), a substrate comprising an aromatic group can be reacted with a sulfonation agent, e.g., sulfuric acid, or a phosphonation agent, e.g., phosphoric acid, to give a sulfonated or phosphonated substrate (XI), respectively, in the form of a sulfonic acid or a phosphonic acid.

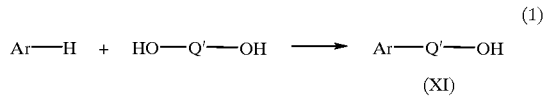

(1)

wherein Ar is an aromatic group and comprises a portion of a polymer main chain, a pendant group attached to the main chain, or a portion of a pendant group and

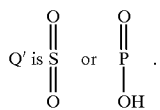

A substrate comprising a sulfonate or phosphonate ester (XII) may be formed from (XI) as shown in Equation (2):

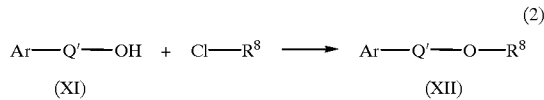

(2)

wherein Q' is as defined above and $R^8$ is an alkyl group ranging from methyl to decyl inclusive and may be linear or branched. Alternatively, the chemical structure of the full phosphonate ester formed from reacting material (XI) with two equivalents of $R^8Cl$ is as follows:

(XIII)

wherein $R^8$ is as defined above. A substrate comprising a sulfonamide or a phosphonamide (XV) may be formed from (XI) and an amine (XIV) as shown in Equation (3):

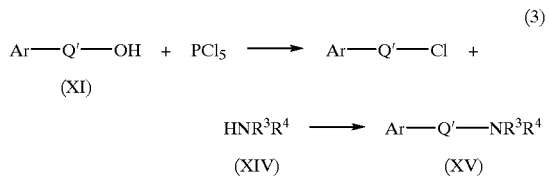

(3)

wherein Q' is as defined above and each $R^3$ and $R^4$ is selected, independently, from hydrogen and an alkyl group ranging from methyl to decyl inclusive and may be linear or branched.

Sulfonation agents, e.g., $SO_3$, $SO_3$ complexes of Lewis bases, sulfonic acid, sulfuric acid, $SO_2$ with oxygen and a free radical initiator, and acyl sulfate, are well known. General techniques for sulfonation are disclosed in U.S. Pat. Nos. 2,832,696, 2,937,066, 3,592,724, 3,613,957, 3,625,751, 3,642,728, 3,629,025, 3,770,706, 3,847,854, 3,856,511, 3,870,841, 3,877,530, 3,959,561, 4,102,876, 4,220,739, 4,615,914, and 4,915,912.

Phosphonation agents, e.g., $PCl_3$ and an $AlCl_3$ catalyst, $PCl_3$/oxygen mixtures, dimethyl phosphite and phosphoric acid, are well known. General techniques for phosphonation are described in U.S. Pat. Nos. 3,097,194, 3,290,276 and 4,255,540 and in British Patent Nos. 849,058 and 907,765.

It is also possible to prepare a sulfonated and/or phosphonated polymer by a process which is a hybrid of the copolymerization process and the sulfonation and/or phosphonation of a substrate process described above. In the hybrid process, polymerization and sulfonation and/or phosphonation occur simultaneously. For example, as described in U.S. Pat. Nos. 3,097,194 and 3,397,219, at least one olefin monomer, $PCl_3$, a catalyst such as $AlCl_3$ or $TiCl_3$, and, optionally, oxygen are reacted to yield a phosphonated copolyolefin.

The sulfonated and/or phosphonated polymer contains from about 0.1 mol % to about 30 mol % of combined sulfonate and phosphonate groups. As used herein, "combined sulfonate and phosphonate groups" includes sulfonic acid, sulfonate ester, sulfonamide, phosphonic acid, phosphonate ester and phosphonamide forms which may be present as any or all combinations thereof. As used herein, "mole percent combined sulfonate and phosphonate groups" is the total number of sulfonate and phosphonate groups present per 100 monomer units. Preferably, the sulfonated and/or phosphonated polymer contains from about 0.5 mol % to about 25 mol % of combined sulfonate and phosphonate groups. More preferably, the sulfonated and/or phosphonated polymer contains from about 1 mol % to about 20 mol % of combined sulfonate and phosphonate groups.

Preferably, sulfonated polymers comprising sulfonate groups are used to form the blends of this invention. As used herein, "sulfonate groups" includes sulfonic acid, sulfonate ester and sulfonamide forms which may be present as any or all combinations thereof. More preferably, the sulfonated polymers used to form the blends of this invention comprise sulfonic acid groups, sulfonamide groups or mixtures thereof.

Suitable substrates for sulfonation and/or hosphonation post-polymerization reactions include the TPEs, thermoplastic polymers and thermoset polymers. Each of these groups of materials is discussed in detail below.

TPEs possess the material and mechanical properties characteristic of an elastomer but, unlike an elastomer, can be processed like a thermoplastic because they exhibit a melting point, which is a characteristic of a thermoplastic. Therefore, a TPE may substitute for an elastomer in imparting desirable rubber properties to a polymer blend while simultaneously maintaining many of the desirable advantages of a thermoplastic during processing, such as low cost fabrication, recyclability of scrap, and rapid, continuous, automated processing.

Generally, TPEs consist of at least two polymer types or phases, each of which has a characteristic softening temperature. One phase is selected to be above its softening point at the use temperature, thereby providing rubbery response, while the other phase is selected to be below its softening point at the use temperature, thereby anchoring the soft material in a manner analogous to the crosslink points of a conventional crosslinked rubber. However, unlike crosslinked rubber, the anchoring effect is reversible and can be removed by heating the TPE to an elevated temperature above both softening points. At the elevated temperature, conventional thermoplastic processing methods are possible. Subsequent cooling to below the upper softening point allows the anchoring effect to be reestablished.

The two polymer types or phases are often chemically joined or bonded to give a block copolymer molecular architecture, but this is not a requirement for exhibiting the typical TPE behavior described above. Mechanical mixing of two polymer types or in situ polymerization or grafting may also result in TPE-like response. A list of 19 discrete chemical types of TPEs is available in Table 2 of the "Kirk-Othmer Encyclopedia of Chemistry and Technology", 4th Ed., Vol. 9, p. 18 (1994).

The preferred TPEs of this invention can be characterized by chemical composition to comprise the following categories: (1) block copoly(ester) copolymers (2) block copoly(amide) copolymers (3) block copoly(urethane) copolymers, (4) styrene-based block copolymers, (5) thermoplastic and elastomer blends wherein the elastomer is not vulcanized (hereafter "TEB") and (6) thermoplastic and elastomer or rubber blends wherein the elastomer is dynamically vulcanized (hereafter "TEDV").

Block copoly(ester) copolymer TPEs (category (1)) comprise alternating blocks of a polyester oligomer, for example polyalkylene terephthalate (material with the higher softening point), wherein the alkylene group is typically 1,4-butylene, and another block with a lower softening point. Optionally, the block copoly(ester) copolymer can be partially comprised of at least one thioester. Still further, the block copoly(ester) copolymer TPE can optionally be a block copoly(thioester) copolymer.

If the lower softening point material of the block copoly(ester) copolymer is an ester, for example, a polylactone such as polycaprolactone, then block copoly(ester-esters) result. If the lower softening point material is a polyether oligomer, for example, a polyalkylene ether, then block copoly(ester-ethers) result. If the lower softening point material is a polythioether oligomer, for example, a polythioalkylene ether, then block copoly(ester-thioethers) result. If the lower softening point material is an α,ω-hydroxybutadiene oligomer such as the POLYBD® resins available from Elf Atochem S.A., optionally at least partially hydrogenated, then block copoly(ester-α,ω-hydroxybutadienes) result. Optionally, the lower softening point material may comprise a mixture, for example, a mixture of any of the above-mentioned lower softening point materials, e.g., polyalkylene ethers such as propylene ether and butylene ether, or a mixture of a polyalkylene ether and a polythioalkylene ether. Furthermore, such mixtures of lower softening point materials may be present in a random or block arrangement, or as mixtures thereof.

Preferably, the block copoly(ester) copolymer TPE is a block copoly(ester-ester), a block copoly(ester-ether), or mixtures thereof. More preferably, the block copoly(ester) copolymer TPE is at least one block copoly(ester-ether) or mixtures thereof. Suitable commercially available TPE copoly(ester-ethers) include the HYTREL® series from DuPont, which includes HYTREL® 3078, G3548W, 4056, G4078W and 6356; the LOMOD® series from General Electric, which includes LOMOD® ST3090A and TE3055A; ARNITEL® and URAFIL® from Akzo; ECDEL® from Eastman Kodak; and RITEFLEX® from Hoechst Celanese.

Block copoly(amide) copolymer TPEs (category (2)) comprise alternating blocks of a polyamide oligomer (material with the higher softening point) and another block with a lower softening point. Block copoly(amides) are described more fully in U.S. Pat. No. 4,331,786 to Foy et al. Optionally, the block copoly(amide) copolymer can be partially comprised of at least one thioamide. The block copoly(amide) copolymer TPE can optionally be a block copoly(thioamide) copolymer.

If the lower softening point material of the block copoly(amide) copolymer is, e.g., a polyether oligomer or a polyalkylene ether, for example, poly(ethylene oxide), then block copoly(amide-ethers) result. If the lower softening point material of the block copoly(amide) copolymer is an ester, for example, a polylactone such as polycaprolactone, then block copoly(amide-esters) result. Any of the lower softening point materials cited in the description of the block copoly(ester) copolymers above may be used to form a block copoly(amide) copolymer. Optionally, the lower softening point material of the block copoly(amide) copolymer may comprise a mixture, for example, a mixture of any of the above-mentioned lower softening point materials. Furthermore, said mixtures of lower softening point materials may be present in a random or block arrangement, or as mixtures thereof.

Preferably, the block copoly(amide) copolymer TPE is a block copoly(amide-ester), a block copoly(amide-ether), or mixtures thereof. More preferably, the block copoly(amide) copolymer TPE is at least one block copoly(amide-ether) or mixtures thereof. Suitable commercially available thermoplastic copoly(amide-ethers) include the PEBAX® series from Elf-Atochem, which includes PEBAX® 2533, 3533, 4033 and 6333; the GRILAMID® series by Emser, which includes Ely 60; and VESTAMID® and VESTENAMER® by Hüls.

Block copoly(urethane) copolymer TPEs (category (3)) comprise alternating blocks of a polyurethane oligomer (material with the higher softening point) and another block with a lower softening point. The polyurethane block comprises a diisocyanate, typically 4,4'-diphenylmethane diisocyanate, 4,4'-dicyclohexylmethane diisocyanate, 2,4-toluene diisocyanate, 2,6-toluene diisocyanate, paraphenylene diisocyanate or mixtures thereof, chain extended with a diol such as 1,4-butanediol, a dithiol such as 1,4-butanedithiol, a thio-substituted alcohol, such as 1-thiolbutane-4-ol, or mixtures thereof. Optionally, the block copoly(urethane) copolymer can be at least partially comprised of at least one dithioisocyanate.

If the lower softening point material of the block copoly(urethane) copolymer is, e.g., a polyether oligomer or a polyalkylene ether, for example, poly(ethylene oxide), then block copoly(urethane-ethers) result. If the lower softening point material of the block copoly(urethane) copolymer is an ester, for example, a polylactone such as polycaprolactone, then block copoly(urethane-esters) result. Any of the lower softening point materials cited in the description of the block copoly(ester) copolymers above may be used to form a block copoly(urethane) copolymer. For example, if the lower softening point material is an α,ω-hydroxybutadiene oligomer, optionally at least partially hydrogenated, then block copoly(urethane-α,ω-hydroxybutadienes) result. Optionally, the lower softening point material of the block copoly(urethane) copolymer may comprise a mixture, for example, a mixture of any of the above-mentioned lower softening point materials. Furthermore, said mixtures of lower softening point materials may be present in a random or block arrangement, or as mixtures thereof.

Preferably, the block copoly(urethane) copolymer TPE is a block copoly(urethane-ester), a block copoly(urethane-ether), or mixtures thereof. Examples of suitable commercially available thermoplastic polyurethanes include the ESTANE® series from the B.F. Goodrich Company, which includes ESTANE® 58133, 58134, 58144 and 58311; the PELLETHANE® series from Dow Chemical, which includes PELLETHANE® 2102-90A and 2103-70A; ELASTOLLAN® from BASF; DESMOPAN® and TEXIN® from Bayer; and Q-THANE® from Morton International.

Block polystyrene TPEs (category (4)) comprise blocks of polystyrene or substituted polystyrene, e.g. poly($\alpha$-methyl styrene) or poly(4-methyl styrene), (material with the higher softening point) chemically linked or joined to the ends of lower softening point blocks of either a rubber with unsaturation or a saturated rubber. Unsaturated rubber types typically include butadiene, to form styrene-butadiene-styrene (hereafter "SBS"), or isoprene, to form styrene-isoprene-styrene (hereafter "SIS") block copolymers. Examples of suitable commercially available thermoplastic SBS or SIS copolymers include the KRATON® D series from Shell Chemical, which includes KRATON® D2109, D5119 and D5298; VECTOR® from Dexco; and FINA-PRENE® from Fina Oil and Chemical.

Alternatively, the polystyrene blocks of polystyrene TPEs are joined to the ends of substantially saturated rubber blocks. Saturated rubber types typically include butyl rubber or hydrogenated butadiene. The latter styrene-(hydrogenated butadiene)-styrene TPEs, wherein the degree of hydrogenation may be partial or substantially complete, are also known as SEBS. Additionally, copolymers of ethylene and propylene or ethylene and butylene can be chemically linked to polystyrene blocks to form styrene-copolyethylene-styrene (hereafter "SES"). Examples of suitable commercially available thermoplastic SES copolymers include the KRATON® G series from Shell Chemical, which includes KRATON® G2705, G7702, G7715 and G7720; SEPTON® from Kuraray; and C-FLEX® from Concept.

Sulfonated SEBS and SES TPEs are disclosed in U.S. Pat. No. 5,239,010.

Additionally, block polystyrene TPEs may be functionalized with polar moieties by grafting a functional comonomer, e.g., a reactive monomer such as maleic anhydride, onto the TPE in a post-polymerization reaction. Examples of commercially available styrene-block elastomers functionalized by grafting include the KRATON® series from the Shell Corporation, which includes KRATON® FG1901X and FG1921X. Furthermore, block polystyrene TPEs may be functionalized with hydroxy or epoxy substitution at the polymer chain ends. An example of a commercially available styrene-block elastomer functionalized by hydroxy termination is SEPTON® HG252 from the Mitsubishi Chemical Company.

Preferably, the block polystyrene TPE comprises an unsaturated rubber, a functionalized substantially saturated rubber, or mixtures thereof. More preferably, the block polystyrene TPE comprises an unsaturated rubber functionalized by grafting with maleic anhydride, an unsaturated rubber functionalized by hydroxy termination, a substantially saturated rubber functionalized by grafting with maleic anhydride, a substantially saturated rubber functionalized by hydroxy termination, or mixtures thereof. Most preferably, the block polystyrene TPE comprises SBS or SIS functionalized by grafting with maleic anhydride, SEBS or SES functionalized by grafting with maleic anhydride, or mixtures thereof.

Unlike the previous four groups of TPEs, wherein the components are linked chemically, the TEB (category (5)) and the TEDV (category (6)) groups are commonly prepared by blending a relatively harder thermoplastic and a relatively softer polymer, which functions like an elastomer. Blending is usually accomplished by mechanical mixing of the two polymer types but in situ polymerization or grafting may also be employed. At the completion of blending, the two polymer components form a finely interdispersed multiphase morphology which is optionally linked by covalent chemical bonds. The dispersion is fine enough such that the resulting blend has the mechanical properties and performance typically expected of a TPE. Typically, the harder polymer is the continuous phase since it is usually present in greater quantity. These blended TPEs can be further characterized by whether the softer, elastomeric component is intentionally vulcanized or substantially free of crosslinks.

The TEBs (category (5)) are comprised of thermoplastic and elastomer blends wherein the elastomer is not intentionally crosslinked or vulcanized. The harder polymer component is typically a polyolefin or halogenated polyolefin, preferably comprising propylene units, or polyvinylchloride. The softer or elastomeric polymer is typically an ethylene-propylene-diene monomer terpolymer (hereafter "EPDM"), ethylene-propylene copolymer rubber (hereafter "EPR") or nitrile rubber. Suitable TEBs include TELCAR® from Teknor Apex, which includes TELCAR 302; TPR® from Advanced Elastomer Systems; REN-FLEX® from Dexter; and POLYTROPE® from Schulman.

Sulfonated EPDM is disclosed in U.S. Pat. No. 3,642,728. Phosphonated EPR is disclosed in U.S. Pat. Nos. 3,097,194 and 4,255,540 and in British Patent No. 849,058.

Preferably, the TEB comprises polypropylene and EPDM; polypropylene and EPR; polypropylene, EPDM and EPR; or mixtures thereof.

The second group of thermoplastic and elastomer blends, the TEDVs (category (6)), are comprised of thermoplastic and elastomer or rubber blends wherein the elastomer is intentionally crosslinked or dynamically vulcanized. This terminology arises because, in typical TEDV blending processes, the elastomer phase is intentionally crosslinked or vulcanized while the melt is subjected to intense shearing fields during blending, in contrast to the quiescent conditions usually present when rubber is vulcanized. The harder polymer component of a TEDV is typically identical to those used in TEBs. The softer or elastomeric polymer of a TEDV is usually natural, nitrile or butyl rubber or EPDM. Suitable TEDVs include SANTOPRENE®, VYRAM® and TREFSIN® from Advanced Elastomer Systems, which includes SANTOPRENE® 101-73 and 203-40 and TREFSIN® 3201-60; the SARLINK® 2000 and 3000 series from DSM; and TELPRENE® from Teknor Apex. In particular, a melt-bondable TEDV is preferred when used in blends comprising polar polymers, such as polyamide and polycarbonate. The melt-bondable TEDV is thought to comprise a polypropylene-EPDM TEDV (wherein the EPDM is vulcanized with peroxide) to which maleic anhydride is grafted and is available as SANTOPRENE® from Advanced Elastomer Systems.

Preferably, the TEDV comprises polypropylene and EPDM; polypropylene and EPR; polypropylene, EPDM and EPR; a melt-bondable TEDV; or mixtures thereof.

Prior to sulfonation and/or phosphonation, the TPE substrate of this invention has a Shore A hardness of at least about 60 or a Shore D hardness of at least about 20, as measured by ASTM method D-2240. Preferably, the Shore D hardness is from about 20 to about 75, more preferably from about 25 to about 55. Prior to sulfonation and/or phosphonation, the TPE substrate of this invention has a flexural modulus, as measured by ASTM method D-790, of at least about 1,000 psi, preferably from about 1,000 psi to about 150,000 psi, more preferably from about 1,000 psi to about 85,000 psi.

After sulfonation and/or phosphonation, the sulfonated and/or phosphonated TPE polymer of this invention has a Shore A hardness of at least about 40 or a Shore D hardness of at least about 15, as measured by ASTM method D-2240. Preferably, the Shore D hardness is from about 20 to about 70, more preferably from about 25 to about 50. After sulfonation and/or phosphonation, the TPE substrate of this invention has a flexural modulus, as measured by ASTM method D-790, of at least about 1,000 psi, preferably from about 1,000 psi to about 150,000 psi, more preferably from about, 1,000 psi to about 80,000 psi.

Other substrates which can be sulfonated and/or phosphonated and then blended with polyamides to form the blends of the claimed invention in forming golf ball compositions can be described as thermoplastic polymers. In particular, the core and/or layer(s) of the present invention may comprise a thermoplastic polymer which is a thermoplastic or an engineering plastic such as: polyolefin; polycarbonate; polyamide; polyphenylene oxide; imidized, amino group containing polymers; high impact polystyrene (hereafter "HIPS"); polyether ketone; polysulfone; poly (phenylene sulfide); poly(ether imide); reinforced engineering plastics; acrylic-styrene-acrylonitrile; poly(N-octadecylacrylamide); poly(octadecyl methacrylate); poly (4-dodecylstyrene); poly(4-tetradecylstyrene); poly (ethylene oxide); poly(oxymethylene); poly(silazane); poly (furan tetracarboxylic acid diimide); poly(acrylonitrile); poly($\alpha$-methylstyrene); as well as the classes of polymers to which they belong and their copolymers, including those comprising a functional comonomer; and blends thereof.

In addition, the thermoplastic polymer may be an olefinic polymer, i.e., a polymer comprising an olefin. The olefinic polymers useful in the invention may be polymers formed with the use of metallocene catalyst technology, and, thus, for the purpose of this application these polymers are also referred to as metallocene catalyzed polymers and copolymers. Metallocene catalyzed polymers may also comprise functional groups such as epoxy, anhydride, amine, oxazoline, sulfonic acid, carboxylic acid and their salts.

As used herein, the term "olefinic polymer" means a polymer or copolymer comprised of at least one olefin with attached linear or branched alkyl groups having from about 1 to about 18 carbon atoms. The term "olefinic polymer" is specifically meant to include the following materials: a polymer comprising an $\alpha$-olefin containing from 2 to 10 carbon atoms; polymers formed with the use of metallocene catalysts and comprising monomers selected from the group consisting of butene, hexene, and octene; polymers formed with the use of metallocene catalysts and selected from the group consisting of a copolymer of ethylene and butene, a copolymer of ethylene and hexene and a copolymer of ethylene and octene; a terpolymer formed with the use of metallocene catalysts and consisting essentially of a polymer of ethylene, propylene, and a diene monomer; copoly (ethylene-vinyl alcohol); a copolymer consisting essentially of an $\alpha$-olefin monomer containing from 2 to 10 carbon atoms and an alkyl acrylate or an alkyl alkylacrylate monomer, wherein each alkyl group ranges, independently, from methyl to decyl inclusive and may be linear or branched; a copolymer consisting essentially of an $\alpha$-olefin monomer containing from 2 to 10 carbon atoms and a glycidyl acrylate or a glycidyl alkylacrylate monomer, wherein the alkyl group ranges from methyl to decyl inclusive and may be linear or branched; a terpolymer consisting essentially of an $\alpha$-olefin monomer containing from 2 to 10 carbon atoms, an alkyl acrylate or an alkyl alkylacrylate monomer, and a glycidyl acrylate or a glycidyl alkylacrylate monomer, wherein each alkyl group ranges, independently, from methyl to decyl inclusive and may be linear or branched; a copolymer consisting essentially of an $\alpha$-olefin monomer containing from 2 to 10 carbon atoms and a vinyloxazoline or 1-alkyl vinyloxazoline monomer, wherein the alkyl group ranges from methyl to decyl inclusive and may be linear or branched; a terpolymer consisting essentially of an $\alpha$-olefin monomer containing from 2 to 10 carbon atoms, an alkyl acrylate or an alkyl alkylacrylate monomer, and a vinyloxazoline or 1-alkyl vinyloxazoline monomer, wherein each alkyl group ranges, independently, from methyl to decyl inclusive and may be linear or branched; a copolymer consisting essentially of an $\alpha$-olefin monomer containing from 2 to 10 carbon atoms and carbon monoxide; a terpolymer consisting essentially of a first $\alpha$-olefin monomer containing from 2 to 10 carbon atoms, a second $\alpha$-olefin monomer containing from 2 to 10 carbon atoms, and carbon monoxide; a copolymer consisting essentially of an $\alpha$-olefin monomer containing from 2 to 10 carbon atoms and sulfur dioxide; a terpolymer consisting essentially of a first $\alpha$-olefin monomer containing from 2 to 10 carbon atoms, a second $\alpha$-olefin monomer containing from 2 to 10 carbon atoms, and sulfur dioxide; a copolymer consisting essentially of an $\alpha$-olefin monomer containing from 2 to 10 carbon atoms and maleic anhydride; a terpolymer consisting essentially of an $\alpha$-olefin monomer containing from 2 to 10 carbon atoms, maleic anhydride, and carbon monoxide; a terpolymer consisting essentially of an $\alpha$-olefin monomer containing from 2 to 10 carbon atoms, maleic anhydride, and sulfur dioxide; and a terpolymer consisting essentially of an $\alpha$-olefin monomer containing from 2 to 10 carbon atoms, maleic anhydride, and an alkyl acrylate or an alkyl alkylacrylate monomer, wherein each alkyl group ranges, independently, from methyl to decyl inclusive and may be linear or branched.

Phosphonated polyethylene is disclosed by Weiss et al., J. Polym. Sci., Polym. Phys., 15:1409 (1977). Phosphonated polypropylene is disclosed in British Patent No. 907,765. Phosphonated poly(4-methylpentene-1) is disclosed in U.S. Pat. No. 3,397,219.

Any of the olefinic polymers may also be functionalized by grafting with, e.g., maleic anhydride. Furthermore, the term "olefinic polymers" also encompasses mixtures of at least two olefinic polymers.

As used herein, the phrase "linear or branched alkyl groups of up to about 18 carbon atoms" means any substituted or unsubstituted acyclic carbon-containing compound, including alkanes, alkenes and alkynes. As used herein, the phrase "alkyl group ranges from methyl to decyl inclusive and may be linear or branched" means any substituted or unsubstituted acyclic carbon-containing compounds, including alkanes, alkenes and alkynes.

Examples of alkyl groups include lower alkyl, for example, methyl, ethyl, n-propyl, iso-propyl, n-butyl, iso-butyl or tert-butyl; upper alkyl, for example, octyl, nonyl, decyl, and the like; and lower alkylene, for example, ethylene, propylene, butylene, butadiene, pentene, hexene, heptene, octene, norbornene, nonene, decene and the like. The ordinary skilled artisan is familiar with numerous linear and branched alkyl groups, which are within the scope of the present invention.

Additionally, such alkyl groups may also contain various substituents in which one or more hydrogen atoms has been replaced by a functional group. Functional groups include but are not limited to hydroxyl, amino, epoxy, carboxyl, sulfonic amide, ester, ether, phosphates, thiol, nitro, silane and halogen (fluorine, chlorine, bromine and iodine), to mention but a few.

The copolymers formed with the use of metallocene catalysts useful in the present invention are commercially available under the trade name AFFINITY® polyolefin plastomers and ENGAGE® polyolefin elastomers by DuPont-Dow Elastomers Company and they are described more fully in U.S. Pat. Nos. 5,272,236 and 5,278,272. Other commercially available polymers formed with the use of metallocene catalysts can be used, such as Exxon Chemical Company's EXACT® and Dow Chemical's INSIGHT® lines of resins, which have superior flexibility and clarity as well as toughness. The EXACT® and INSIGHT® lines of polymers also have novel rheological behavior in addition to their other properties as a result of using a metallocene catalyst technology. The method of making EXACT® and INSIGHT® polymers and their compositions are more fully detailed in U.S. Pat. No. 5,359,015 and 5,281,679.

Preferably, the thermoplastic polymer substrate is an ethylene or propylene based homopolymer or copolymer (including functional monomers such as acrylic and methacrylic acid, such as the ethylene-methyl acrylate or ethylene-butyl acrylate copolymer series available from Quantum Chemical); polymers formed with the use of metallocene catalysts and consisting essentially of a copolymer of ethylene and butene, a copolymer of ethylene and hexene or a copolymer of ethylene and octene; a terpolymer formed with the use of metallocene catalysts and consisting essentially of a polymer of ethylene, propylene and a diene monomer; poly(amide); poly(methyl acrylate); poly(methyl methacrylate); acrylonitrile-butadiene-styrene copolymer (hereafter "ABS"); a polymer comprising an alkyl acrylate or an alkyl alkylacrylate, wherein each alkyl group ranges, independently, from methyl to decyl inclusive and may be linear or branched; a polymer comprising an α-olefin containing from 2 to 10 carbon atoms; and their copolymers, including those comprising a functional comonomer; and blends thereof.

More preferably, the thermoplastic polymer substrate comprises an aryl group. Such thermoplastic polymers include but are not limited to polyesters, such as poly (ethylene terephthalate), e.g., EKTAR® available from Eastman Kodak, poly(butylene terephthalate), poly (trimethylene terephthalate), e.g., CORTERRA® available from Shell Chemical, and poly(ethylene naphthalate) available from ICI Polyester and Teijin Chemical; polyamide, such as PA-6,T/6,6 and PA-6,T/6,I/6,6; polycarbonate; polyphenylene oxide; polyether ketone; polysulfone; poly (phenylene sulfide); poly(ether imide); reinforced engineering plastics; polymers comprising styrene, such as acrylic-styrene-acrylonitrile, ABS, HIPS, poly(4-dodecylstyrene), poly(4-tetradecylstyrene), poly(α-methylstyrene), a copolymer consisting essentially of a styrene or an α-alkyl styrene monomer and a vinyloxazoline or a 1-alkyl vinyloxazoline monomer, wherein the alkyl groups range, independently, from methyl to decyl inclusive and may be linear or branched, and a terpolymer consisting essentially of a styrene or an α-alkyl styrene monomer, an alkyl acrylate or an alkyl alkylacrylate monomer, and a vinyloxazoline or a 1-alkyl vinyloxazoline monomer, wherein the alkyl groups range, independently, from methyl to decyl inclusive and may be linear or branched; and blends thereof.

If desired, the thermoplastic substrate may comprise an impact modifier or a toughened or impact-modified material, such as ABS, or preferably HIPS.

Before sulfonation and/or phosphonation, the thermoplastic polymer substrate has a Shore D hardness of at least about 20, preferably from about 20 to about 75, more preferably from about 25 to about 55, as measured by ASTM method D-2240, and a flexural modulus, as measured by ASTM method D-790, of at least about 5,000 psi, preferably from about 5,000 psi to about 500,000 psi, more preferably from about 10,000 psi to about 300,000 psi.

After sulfonation and/or phosphonation, the sulfonated and/or phosphonated thermoplastic polymer of this invention has a Shore D hardness of at least about 20, preferably from about 20 to about 75, as measured by ASTM method D-2240, a flexural modulus, as measured by ASTM method D-790, of at least about 10,000 psi, preferably from about 30,000 psi to about 500,000 psi, and a melt index from about 0.3 to about 50 g/10 min, as measured by ASTM method D-1238, condition E using a 2.16 kg weight.

Still other substrates which can be sulfonated and/or phosphonated to form a sulfonated and/or phosphonated polymer and then blended with polyamides to form the blends of the claimed invention in forming golf ball compositions can be described as thermoset polymers. For the purposes of this application, "thermoset polymer" also includes functionalized thermoset polymers, thermoset copolymers, functionalized thermoset copolymers, and mixtures thereof. hermoset polymers include but are not limited to rubber, such as poly(isoprene), both natural and synthetic; poly(butadiene); poly(chloroprene); poly(urethane); poly (urea); poly(siloxane); styrene-butadiene rubber; EPDM rubber; nitrile rubber; butyl rubber; chlorotrifluoroethylene copolymer rubber; vinylidene fluoride-hexafluoropropylene copolymer rubber; polysulfide rubber; and epichlorohydrin rubber, and polymers which are crosslinked or crosslinkable, such as poly(ester); phenolic resin; epoxy resin and any thermoplastic polymer which may be crosslinked.

Sulfonated polybutadiene, sulfonated polyisoprene and sulfonated butyl rubber are disclosed in U.S. Pat. No. 3,642,728.

Preferably, the thermoset polymer substrate comprises polybutadiene, polyisoprene, thermoset poly(urethane) such as those described by U.S. Pat. No. 5,334,673, thermoset poly(urea) such as those described by U.S. Pat. No. 5,484,870, or mixtures thereof.

Before sulfonation and/or phosphonation, the thermoset polymer substrate has a Shore D hardness of at least about 20, preferably from about 25 to about 70, more preferably from about 25 to about 60, as measured by ASTM method D-2240, and a flexural modulus, as measured by ASTM method D-790, of at least about 1,000 psi, preferably from about 1,000 psi to about 100,000 psi, more preferably from about 1,000 psi to about 50,000 psi.

After sulfonation and/or phosphonation, the sulfonated and/or phosphonated thermoset polymer of this invention has a Shore D hardness of at least about 20, as measured by ASTM method D-2240, a flexural modulus, as measured by ASTM method D-790, of at least about 1,000 psi, preferably from about 1,000 psi to about 100,000 psi, more preferably from about 1,000 psi to about 50,000 psi.

Optionally, the polyamide-sulfonated and/or phosphonated polymer blend may be mixed with at least one co-component polymer. As used herein, a "co-component polymer" is a polymer or copolymer which is not sulfonated and/or phosphonated. A co-component polymer may be, for example, a TPE, a thermoplastic polymer, a thermoset polymer, or mixture thereof, none of these materials being sulfonated and/or phosphonated. Such mixtures may comprise from about 10% to about 99% by weight of the blend and from about 90% to about 1% by weight of the co-component polymer. Preferably, the mixture comprises from about 25% to about 95% by weight of the blend and from about 75% to about 5% by weight of the co-component polymer. More preferably, the mixture comprises from about 60% to about 90% by weight of the blend and from about 40% to about 10% by weight of the co-component polymer. optionally, the co-component polymer mixed with the polyamide-sulfonated and/or phosphonated polymer blend may comprise a polyamide or may comprise polyamide blocks. optionally, the polyamide-sulfonated and/or phosphonated polymer blend may be mixed with a sulfonated and/or phosphonated polymer.

In an alternate embodiment of this invention, the polyamide component, which may be any of the polyamides discussed in detail above, may be sulfonated and/or phosphonated. A separate sulfonated and/or phosphonated polymer component is not required in this embodiment because the polyamide is also the sulfonated and/or phosphonated polymer component. Preferably, the polyamide has an aromatic group, vinyl unsaturation or both of these characteristics. More preferably, the polyamide comprises an aromatic group. The aromatic group can be present in the main polyamide chain, in a side-group attached to the main polyamide chain, or both. Preferably, the aromatic group of a sulfonated and/or phosphonated polyamide is present in the main polyamide chain. Preferably, the monomer used to form the polyamide comprising an aromatic group comprises m-phenylenediamine, p-phenylenediamine, m-xylylenediamine, isophthalic acid, terephthalic acid, 2,6-naphthalenedicarboxylic acid or mixtures thereof. Preferably, the polyamide comprising an aromatic group is PA-6,T/6,6; PA-6,T/6,I/6,6; PA-6,T/6; PA-6,T/6,I; PA-6,T/6,6 or mixtures thereof.

Optionally, the sulfonated and/or phosphonated polyamide may be blended with at least one co-component polymer. Optionally, the co-component polymer blended with the sulfonated and/or phosphonated polyamide may comprise a polyamide or may comprise polyamide blocks. Optionally, the sulfonated and/or phosphonated polyamide may be blended with a sulfonated and/or phosphonated polymer.

When a co-component polymer is mixed with the sulfonated and/or phosphonated polyamide, such mixtures may comprise from about 10% to about 99% by weight of the sulfonated and/or phosphonated polyamide and from about 90% to about 1% by weight of the co-component polymer. Preferably, the mixture comprises from about 25% to about 95% by weight of the sulfonated and/or phosphonated polyamide and from about 75% to about 5% by weight of the co-component polymer. More preferably, the mixture comprises from about 60% to about 90% by weight of the sulfonated and/or phosphonated polyamide and from about 40% to about 10% by weight of the co-component polymer.

Preferably, when the co-component polymer is a thermoplastic polymer, the thermoplastic polymer comprises a polyamide, such as the ZYTEL® series of poly(amides) available from DuPont; poly(ethylene terephthalate), such as EKTAR® available from Eastman Kodak; poly(butylene terephthalate); poly(trimethylene terephthalate), such as CORTERRAO available from Shell Chemical; poly (ethylene naphthalate) available from ICI Polyester and Teijin Chemical; poly(vinyl alcohol); poly(vinyl acetate); poly(silane); poly(vinylidene fluoride); acrylonitrile-butadiene-styrene copolymer; a copolymer consisting essentially of a styrene or an α-alkyl styrene monomer and a vinyloxazoline or a 1-alkyl vinyloxazoline monomer, wherein the alkyl groups range, independently, from methyl to decyl inclusive and may be linear or branched; a terpolymer consisting essentially of a styrene or an α-alkyl styrene monomer, an alkyl acrylate or an alkyl alkylacrylate monomer, and a vinyloxazoline or a 1-alkyl vinyloxazoline monomer, wherein the alkyl groups range, independently, from methyl to decyl inclusive and may be linear or branched; olefinic polymers; and their copolymers, including those comprising a functional comonomer; and blends thereof.

More preferably, the thermoplastic co-component polymer is a polyamide homopolymer or copolymer, such as polyamide 4, polyamide 6, polyamide 7, polyamide 11, polyamide 12, polyamide 13, polyamide 4,6, polyamide 6,6, polyamide 6,9, polyamide 6,10, polyamide 6,12, polyamide 12,12, polyamide 13,13, polyamide 6/6,6, polyamide 6,6/6, 10, polyamide 6/6,T, polyamide 6/6,6/6,10 and mixtures thereof; an ethylene or propylene based homopolymer or copolymer, such as the ethylene-methyl acrylate or ethylene-butyl acrylate copolymer series available from Quantum Chemical; polymers formed with the use of metallocene catalysts and consisting essentially of a copolymer of ethylene and butene, a copolymer of ethylene and hexene or a copolymer of ethylene and octene; a terpolymer formed with the use of metallocene catalysts and consisting essentially of a polymer of ethylene, propylene and a diene monomer; poly(methyl acrylate); poly(methyl methacrylate); ABS; a polymer comprising an alkyl acrylate or an alkyl alkylacrylate, wherein each alkyl group ranges, independently, from methyl to decyl inclusive and may be linear or branched; a polymer comprising an α-olefin containing from 2 to 10 carbon atoms; and their copolymers, including those comprising a functional comonomer; and blends thereof.

Preferably, when the co-component polymer is a TPE, the TPE comprises a block copoly(ester-ester), a block copoly (ester-ether), a block copoly(amide-ester), a block copoly (amide-ether), a block copoly(urethane-ester), a block copoly(urethane-ether), a block polystyrene thermoplastic elastomer comprising an unsaturated rubber, a block polystyrene thermoplastic elastomer comprising a functionalized substantially saturated rubber, a thermoplastic and elastomer blend comprising polypropylene and ethylene-propylene-diene monomer terpolymer or ethylene-propylene copolymer rubber wherein the rubber is dynamically vulcanized, or a mixture thereof.

More preferably, the TPE co-component polymer is a block copoly(amide-ether), a block copoly(ester-ether), a block copoly(urethane-ether), or mixtures thereof.

Preferably, when the co-component polymer is a thermoset polymer, the thermoset polymer comprises poly (urethane), poly(urea), epoxy resin or mixtures thereof.

More preferably, the thermoset co-component polymer is poly(urethane), poly(urea), or mixtures thereof.

The co-component polymer has a Shore D hardness of at least about 20, preferably from about 25 to about 70, as measured by ASTM method D-2240, and a flexural modulus, as measured by ASTM method D-790, of at least about 1,000 psi, preferably from about 1,000 psi to about 500,000 psi.

When an intermediate layer in a golf ball constructed according to the invention comprises a polyamide-sulfonated and/or phosphonated polymer blend or a sulfonated and/or phosphonated polyamide, the cover may also comprise at least one ionomer. The ionomer useful in the construction described above may be an ionomer or a functionalized ionomer, a copolymer ionomer or a functionalized copolymer ionomer, or mixtures thereof, that comprises, but is not limited to: polyolefin, polyester, block copoly(ether-ester), block copoly(ester-ester), polyamide, polyether, polyurethane, polyacrylate, polystyrene, SBS, SEBS, and polycarbonate, in the form of a homopolymer, a copolymer or a block copolymer ionomer.

For the purposes of this application, an ionomer is a polymer which comprises acidic groups such as carboxylic, sulfonic or phosphonic acid groups, or basic groups, such as quaternary nitrogen, the acidic or basic groups being at least partially neutralized with a conjugate acid or base. Negatively charged acidic groups, such as carboxylate or sulfonate, may be neutralized with a cation, such as a metal ion or a quaternary phosphonium cation. Positively charged basic groups, such as quaternary nitrogen, may be neutralized with an anion, such as a halide, an organic acid, or an organic halide. Acidic or basic groups may be incorporated into an ionomer through copolymerization of an acidic or basic monomer, such as alkyl (meth)acrylate, with at least one other comonomer, such as an olefin, styrene or vinyl acetate, followed by at least partial neutralization to form an ionomer. Alternatively, acidic or basic groups may be incorporated into a polymer to form an ionomer by reacting the polymer, such as polystyrene or a polystyrene copolymer including a block copolymer of polystyrene, with a functionalizing reagent, such as a carboxylic acid or sulfonic acid, followed by at least partial neutralization.

In particular, the ionomer may comprise a so-called "high acid" ionomer, for example, a copolymer of an olefin, e.g. ethylene, and at least 16 wt. % of an $\alpha,\beta$-ethylenically unsaturated carboxylic acid, e.g. acrylic or methacrylic acid, wherein from about 10% to about 90% of the carboxylic acid groups are neutralized with a metal ion, e.g. zinc, sodium, magnesium or lithium. Preferably, the high acid ionomer is a copolymer of ethylene and about 17-20 wt. % methacrylic acid wherein from about 35% to about 65% of the carboxylic acid groups are neutralized by sodium. Examples of commercially available high acid ionomers include SURLYN® 8140, which is an ethylene-based ionomer believed to comprise 17-20 wt. % methacrylic acid and to be neutralized with sodium, and SURLYN® AD 8546, which is an ionomer believed to comprise 17-20 wt. % methacrylic acid and to be neutralized with lithium.

Preferably, when an intermediate layer in a golf ball constructed according to the invention comprises a polyamide-sulfonated and/or phosphonated polymer blend or a sulfonated and/or phosphonated polyamide, the cover comprises at least one material selected from the group consisting of thermoplastic polymers, thermoplastic elastomers, thermoset polymers and ionomers. More preferably, the cover comprises an ionomer comprising at least one material selected from the group consisting of: polyolefin, polyester, polystyrene, SBS, SEBS and polyurethane, in the form of a homopolymer, a copolymer or a block copolymer ionomer; nonionic olefinic homopolymers and copolymers; poly(amide); poly(methyl acrylate); poly(methyl methacrylate); ABS; poly(urethane); poly (urea); poly(isoprene) which is at least partially crosslinked; and poly(butadiene) which is at least partially crosslinked.

Most preferably, when an intermediate layer in a golf ball constructed according to the invention comprises a polyamide-sulfonated and/or phosphonated polymer blend or a sulfonated and/or phosphonated polyamide, the cover comprises at least one material selected from the group consisting of: nonionic olefinic polymers; polyamide; polyolefin ionomers; SBS ionomers; SEBS ionomers; poly (isoprene) which is at least partially crosslinked; poly (butadiene) which is at least partially crosslinked; a thermoset poly(urethane) such as those described by U.S. Pat. No. 5,334,673; and a thermoset poly(urea) such as those described by U.S. Pat. No. 5,484,870.

In a further alternative embodiment, a cover layer, an intermediate layer, and/or a core or core layer in a golf ball comprising a composition according to the invention can be present in the form of a foamed polymeric material. The use of a foamed polymer allows the golf ball designer to adjust the density or mass distribution of the ball to adjust the angular moment of inertia, and, thus, the spin rate and performance of the ball. Foamed materials also offer a potential cost savings due to the reduced use of polymeric material.

Either injection molding or compression molding may be used to form a layer or a core comprising a foamed polymeric material. For example, a composition of the present invention can be thermoformed and, thus, can be compression molded. Alternatively, when the layer or the core is injection molded from a composition of the present invention, a physical or chemical blowing or foaming agent may be included to produce a foamed layer. Blowing or foaming agents useful include but are not limited to organic blowing agents, such as azobisformamide; azobisisobutyronitrile; diazoaminobenzene; N,N-dimethyl-N,N-dinitroso terephthalamide; N,N-dinitrosopentamethylene-tetramine; benzenesulfonyl-hydrazide; benzene-1,3-disulfonyl hydrazide; diphenylsulfon-3-3, disulfonyl hydrazide; 4,4'-oxybis benzene sulfonyl hydrazide; p-toluene sulfonyl semicarbizide; barium azodicarboxylate; butylamine nitrile; nitroureas; trihydrazino triazine; phenyl-methyl-uranthan; p-sulfonhydrazide; peroxides; and inorganic blowing agents such as ammonium bicarbonate and sodium bicarbonate. A gas, such as air, nitrogen, carbon dioxide, etc., can also be injected into the composition during the injection molding process.

Additionally, a foamed composition of the present invention may be formed by blending microspheres with the composition either during or before the molding process. Polymeric, ceramic, metal, and glass microspheres are useful in the invention, and may be solid or hollow and filled or unfilled. In particular, microspheres up to about 1000 micrometers in diameter are useful.

Additional materials conventionally included in golf ball cover compositions may be added to the compositions of the invention to enhance the formation of golf ball covers. These additional materials include, but are not limited to, dyes, whitening agents, pigments, UV absorbers, optical brighteners, processing aids, metal particles, such as metal flakes, metal powders and mixtures thereof, and other conventional additives. Antioxidants, stabilizers, softening agents, plasticizers, including internal and external plasticizers, impact modifiers, toughening agents, foaming agents, fillers, reinforcing materials and compatibilizers can also be added to any composition of the invention. All of these materials, which are well known in the art, are added for their usual purpose in typical amounts.

Nucleating agents may optionally be added to the polyamide component or to a blend comprising polyamide. They are thought to be able to beneficially alter the properties of a polyamide component which is not amorphous by changing its semicrystalline nature, such as its degree of crystallinity and the distribution of crystallite sizes. A nucleating agent typically leads to greater uniformity in the rate of crystal growth and in the size, number and type of crystals formed from the molten polyamide. The more uniform crystalline texture produced by the added nucleating agent may result in increased flexural modulus and hardness. Nucleating agents such as finely dispersed silicas may be added in typical amounts, as is known to those with skill in the art.

The compositions of the invention can be reinforced by blending with a wide range of fillers, e.g., glass fibers, inorganic particles and metal particles, as is known to those with skill in the art.

The blends of the invention are formed by combining the polymer components by methods familiar to those in the polymer blending art, for example, with a two roll mill, a Banbury mixer or a single or twin-screw extruder. The single screw extruder may optionally have a grooved barrel wall, comprise a barrier screw or be of a shortened screw design. The twin screw extruder may be of the counter-rotating non-intermeshing, co-rotating non-intermeshing, counter-rotating fully intermeshing or co-rotating fully intermeshing type. Preferably, the normally higher-melting polyamide component is first melted in the main extruder and the molten sulfonated and/or phosphonated component is introduced as a side-stream into a main extruder conveying molten polyamide where the two melts are intermixed to form a blend.

Conventional equipment used in the production of golf balls may be used to form the golf balls of the invention in a manner well known to those skilled in the art. For example, golf balls comprising the cover compositions of the invention can be made by injection molding cover stock formed from a polyamide-sulfonated and/or phosphonated polymer blend of the invention around a core or by compression molding pre-formed half-shells of the cover stock into a ball mold in a conventional manner. Furthermore, golf ball intermediate layers comprising the intermediate layer compositions of the invention can be made by injection molding intermediate layer stock formed from a polyamide-sulfonated and/or phosphonated polymer blend of the invention around a core or by compression molding pre-formed half-shells of the intermediate layer stock into a ball mold in a conventional manner, then covered by a layer comprising cover stock as described above, to form a multilayer golf ball.

After molding, golf balls comprising the golf ball compositions of the invention can be finished by buffing, painting, and stamping.

The properties such as hardness, modulus, core diameter, intermediate layer thickness and cover layer thickness of the golf balls of the present invention have been found to effect play characteristics such as spin, initial velocity and feel of the present golf balls.

In particular, the diameter of the core of the present invention is from about 1.000 inches to about 1.630 inches. Preferably the diameter of the core is from about 1.300 inches to about 1.600 inches. More preferably, the diameter of the core is from about 1.390 inches to about 1.580 inches. The thickness of an intermediate layer of the invention, when present, is from about 0.0020 inches to about 0.100 inches. Preferably, the thickness of the intermediate layer is from about 0.030 inches to about 0.090 inches. More preferably, the thickness of the intermediate layer is from about 0.020 inches to about 0.090 inches. Most preferably, the thickness of the intermediate layer is from about 0.030 inches to about 0.060 inches. Furthermore, the thickness of the cover layer of the present invention is from about 0.030 inches to about 0.120 inches. Preferably, the thickness of the cover layer is from about 0.040 inches to about 0.100 inches. Most preferably, the thickness of the cover layer is from about 0.050 inches to about 0.090 inches. Preferably, the overall diameter of the core and all intermediate layers is from about 80% to about 98% of the overall diameter of the finished ball, and is preferably from about 1.680 inches to about 1.780 inches.

The present multilayer golf ball can have an overall diameter of any size. Although the United States Golf Association (hereafter "USGA") Rules of Golf limit the minimum size of a competition golf ball to 1.680 inches in diameter, there is no specification as to the maximum diameter. Moreover, golf balls of any size can be used for recreational play. The preferred diameter of the present golf balls is from about 1.680 inches to about 1.800 inches. The more preferred diameter is from about 1.680 inches to about 1.760 inches. The most preferred diameter is from about 1.680 inches to about 1.740 inches.

Several physical properties such as hardness and modulus of the various layers of the golf balls of the present invention are believed to impact the playing characteristics of such golf balls. For example, the flexural and/or tensile modulus of the intermediate layer are believed to have an effect on the "feel" of the golf balls of the present invention. Accordingly, it is preferable that the golf balls of the present invention have an intermediate layer with a flexural modulus of from about 500 psi to about 500,000 psi. More preferably, the flexural modulus of the intermediate layer is from about 1,000 psi to about 250,000 psi. Most preferably, the flexural modulus of the intermediate layer is from about 2,000 psi to about 200,000 psi.

Similarly, it is preferable that the golf balls of the present invention have a cover layer with a flexural modulus from about 10,000 psi to about 150,000 psi. More preferably, the flexural modulus of the cover layer is from about 15,000 psi to about 120,000 psi. Most preferably, the flexural modulus of the cover layer is from about 18,000 psi to about 110,000 psi.

The golf ball compositions of the present invention have a core hardness from about 50 Shore A to about 90 Shore D. Preferably, the core has a Shore D hardness from about 30 to about 65. More preferably, the core has a Shore D hardness from about 35 to about 60. An intermediate layer of the golf balls of the present invention preferably has a hardness of from about 60 Shore A to about 85 Shore D. More preferably, the hardness of an intermediate layer is from about 65 Shore A to about 80 Shore D. The cover layer of the golf balls of the present invention preferably has a Shore D hardness from about 40 to about 90. More preferably, the Shore D hardness of the cover layer is from about 45 to about 85. Most preferably, the cover layer has a Shore D hardness from about 50 to about 80.

Forming a blend of a polyamide and a sulfonated and/or phosphonated polymer dramatically improves the ability to control the mechanical properties of the blend, including tensile and flexural modulus and Shore hardness.

The compositions of the invention provide golf balls and covers having the durability and distance of ionomer covered two-piece balls and the feel, click and control of balata covered three-piece balls.

The contents of all patents cited herein are incorporated by reference in their entirety.

I claim:

1. A golf ball comprising a cover and a core, wherein the cover is formed of a composition which comprises a blend of from about 1 wt. % to about 99 wt. % of at least one polyamide polymer and from about 99 wt. % to about 1 wt. % of at least one sulfonated and/or phosphonated polymer selected from the group consisting of sulfonated polymers, phosphonated polymers, sulfonated and phosphonated polymers, and mixtures thereof.

2. The golf ball of claim 1, wherein the polyamide polymer has a flexural modulus of from about 30,000 psi to about 500,000 psi.

3. The golf ball of claim 1, wherein the polyamide polymer is selected from the group consisting of polyamide homopolymers, polyamide copolymers and mixtures thereof.

4. The golf ball of claim 3, wherein the polyamide homopolymer is selected from the group consisting of polyamide 6, polyamide 11, polyamide 12, polyamide 4,6, polyamide 6,6, polyamide 6,9, polyamide 6,10, polyamide 6,12 and mixtures thereof.

5. The golf ball of claim 3, wherein the polyamide copolymer is selected from the group consisting of polyamide 6/6,6, polyamide 6,6/6,10, polyamide 6/6,T, polyamide 6/6,6/6,10 and mixtures thereof.

6. The golf ball of claim 1, wherein the sulfonated and/or phosphonated polymer is a sulfonated polymer selected from the group consisting of sulfonated thermoplastic elastomers, sulfonated thermoplastic polymers, and mixtures thereof.

7. The golf ball of claim 6, wherein the sulfonated polymer contains from about 0.1 mol % to about 30 mol % sulfonate groups.

8. The golf ball of claim 6, wherein the sulfonated polymer comprises sulfonate groups present in the form of a sulfonic acid, a sulfonamide, or mixtures thereof.

9. The golf ball of claim 6, wherein the sulfonated thermoplastic elastomer has a flexural modulus of from about 1,000 psi to about 150,000 psi.

10. The golf ball of claim 9, wherein the sulfonated thermoplastic elastomer is a block copoly(ester-ester), a block copoly(ester-ether), a block copoly(amide-ester), a block copoly(amide-ether), a block copoly(urethane-ester), a block copoly(urethane-ether), a block polystyrene thermoplastic elastomer comprising an unsaturated rubber, a block polystyrene thermoplastic elastomer comprising a functionalized substantially saturated rubber, an unvulcanized thermoplastic and elastomer blend comprising polypropylene and ethylene-propylene-diene monomer terpolymer or ethylene-propylene copolymer rubber, a thermoplastic and elastomer blend comprising polypropylene and ethylene-propylene-diene monomer terpolymer or ethylene-propylene copolymer rubber wherein the rubber is dynamically vulcanized, a melt-bondable thermoplastic and elastomer blend wherein the rubber is dynamically vulcanized, or mixtures thereof.

11. The golf ball of claim 6, wherein the sulfonated thermoplastic polymer has a flexural modulus of from about 30,000 psi to about 500,000 psi.

12. The golf ball of claim 11, wherein the sulfonated thermoplastic polymer is a polyolefin, a polyester, a polyamide, a polycarbonate, a polyphenylene oxide, a polyether ketone, a polysulfone, a poly(phenylene sulfide), poly(ether imide), a reinforced engineering plastic, a polymer comprising styrene, or mixtures thereof.

13. The golf ball of claim 1, wherein said composition is substantially free of optical brightener.

14. The golf ball of claim 1, wherein the composition further comprises from about 90% to about 1% by weight of a co-component polymer and wherein said blend is present in an amount of from about 10% to about 99% by weight.

15. The golf ball of claim 14, wherein the co-component polymer is selected from the group consisting of thermoplastic elastomers, thermoplastic polymers, and mixtures thereof.

16. The golf ball of claim 15, wherein the thermoplastic elastomer is selected from the group consisting of a block copoly(ester-ester), a block copoly(ester-ether), a block copoly(amide-ester), a block copoly(amide-ether), a block copoly(urethane-ester), a block copoly(urethane-ether), a block polystyrene thermoplastic elastomer comprising an unsaturated rubber, a block polystyrene thermoplastic elastomer comprising a functionalized substantially saturated rubber, an unvulcanized thermoplastic and elastomer blend comprising polypropylene and ethylene-propylene-diene monomer terpolymer or ethylene-propylene copolymer rubber, a thermoplastic and elastomer blend comprising polypropylene and ethylene-propylene-diene monomer terpolymer or ethylene-propylene copolymer rubber wherein the rubber is dynamically vulcanized, a melt-bondable thermoplastic and elastomer blend wherein the rubber is dynamically vulcanized, or mixtures thereof.

17. The golf ball of claim 15, wherein the thermoplastic polymer is selected from the group consisting of poly(amide), poly(ethylene terephthalate), poly(butylene terephthalate), poly(trimethylene terephthalate), poly(ethylene naphthalate), poly(vinyl alcohol), poly(vinyl acetate), poly(silane), poly(vinylidene fluoride), acrylonitrile-butadiene-styrene copolymer, their copolymers, and mixtures thereof.

18. The golf ball of claim 15, wherein the thermoplastic polymer comprises at least one olefinic polymer.

19. A golf ball comprising a cover layer, a core layer and at least one intermediate layer interposed between the cover layer and the core layer, wherein at least one of said layers comprises a composition which comprises a blend of from about 1 wt. % to about 99 wt. % of at least one sulfonated and/or phosphonated polymer and from about 99 wt. % to about 1 wt. % of at least one polyamide polymer.

20. The golf ball of claim 19, wherein the polyamide polymer has a flexural modulus of from about 30,000 psi to about 500,000 psi.

21. The golf ball of claim 19, wherein the polyamide polymer is selected from the group consisting of polyamide homopolymers, polyamide copolymers and mixtures thereof.

22. The golf ball of claim 19, wherein the intermediate layer is comprised of said composition and wherein the cover layer comprises at least one material selected from the group consisting of nonionic olefinic polymers, polyolefin ionomers, styrene-butadiene-styrene ionomers, styrene-(hydrogenated butadiene)-styrene ionomers, poly(isoprene) which is at least partially crosslinked, poly(butadiene) which is at least partially crosslinked, a thermoset poly(urethane), and a thermoset poly(urea).

23. The golf ball of claim 19, wherein at least one intermediate layer is a wound layer.

24. The golf ball of claim 19, wherein the core layer comprises a liquid or solid center wrapped in elastomeric windings.

25. The golf ball of claim 19, wherein the sulfonated and/or phosphonated polymer is a sulfonated polymer selected from the group consisting of sulfonated thermoplastic elastomers, sulfonated thermoplastic polymers, and mixtures thereof.

26. The golf ball of claim 25, wherein the sulfonated thermoplastic elastomer has a flexural modulus of from about 1,000 psi to about 150,000 psi.

27. The golf ball of claim 25, wherein the sulfonated thermoplastic polymer has a flexural modulus of from about 30,000 psi to about 500,000 psi.

28. The golf ball of claim 25, wherein the sulfonated polymer contains from about 0.1 mol % to about 30 mol % sulfonate groups.

29. The golf ball of claim 19, wherein the composition further comprises from about 90% to about 1% by weight of a co-component polymer and wherein said blend is present in an amount of from about 10% to about 99% by weight.

30. A golf ball comprising a cover layer, a core layer and at least one intermediate layer interposed between the cover layer and the core layer, wherein at least one of said layers comprises a composition which comprises a polyamide selected from the group consisting of a sulfonated polyamide, a phosphonated polyamide, a sulfonated and phosphonated polyamide, and mixtures thereof.

31. The golf ball of claim 30, wherein the polyamide comprises an aromatic group.

32. The golf ball of claim 30, wherein the aromatic group is present in the form of a monomer used to form the polyamide, and wherein the monomer is selected from the group consisting of m-phenylenediamine, p-phenylenediamine, m-xylylenediamine, isophthalic acid, terephthalic acid, 2,6-naphthalenedicarboxylic acid and mixtures thereof.

33. The golf ball of claim 31, wherein the polyamide is selected from the group consisting of PA-6,T/6,6, PA-6,T/6,I/6,6, PA-6,T/6, PA-6,T/6,I, PA-6,T/6,6, and mixtures thereof.

34. The golf ball of claim 30, wherein the polyamide is a sulfonated polyamide, and wherein the sulfonated polyamide has a flexural modulus of from about 30,000 psi to about 500,000 psi.

35. The golf ball of claim 34, wherein the sulfonated polyamide contains from about 0.1 mol % to about 30 mol % sulfonate groups.

36. The golf ball of claim 30, wherein the composition further comprises from about 90% to about 1% by weight of a co-component polymer and wherein said polyamide is present in an amount of from about 10% to about 99% by weight.

37. A method of making a golf ball, comprising: forming a core layer; forming at least one intermediate layer about the core layer; and forming a cover layer over said at least one intermediate layer; wherein at least one of said layers is formed of a composition comprising a blend of from about 1 wt. % to about 99 wt. % of at least one polyamide polymer and from about 99 wt. % to about 1 wt. % of at least one sulfonated and/or phosphonated polymer.

38. A method of making a golf ball, comprising: forming a core layer; forming at least one intermediate layer about the core layer; and forming a cover layer over said at least one intermediate layer; wherein at least one of said layers is formed of a polyamide selected from the group consisting of a sulfonated polyamide, a phosphonated polyamide, a sulfonated and phosphonated polyamide, and mixtures thereof.

* * * * *